(12) United States Patent
Walters et al.

(10) Patent No.: US 12,146,807 B2
(45) Date of Patent: Nov. 19, 2024

(54) SYSTEMS, METHODS AND APPARATUSES FOR LAUNCHING LASER BEAMS INTO MULTIPLE FIBERS AND/OR COMBINING BEAMS

(71) Applicant: Sunrise International, Inc., Marietta, GA (US)

(72) Inventors: Craig T. Walters, Powell, OH (US); David Sokol, Dublin, OH (US)

(73) Assignee: Sunrise International, Inc., Marietta, GA (US)

(*) Notice: Subject to any disclaimer, the term of this patent is extended or adjusted under 35 U.S.C. 154(b) by 785 days.

(21) Appl. No.: 17/281,627

(22) PCT Filed: Oct. 1, 2019

(86) PCT No.: PCT/US2019/054094
§ 371 (c)(1),
(2) Date: Mar. 31, 2021

(87) PCT Pub. No.: WO2020/072512
PCT Pub. Date: Apr. 9, 2020

(65) Prior Publication Data
US 2021/0372881 A1    Dec. 2, 2021

Related U.S. Application Data

(60) Provisional application No. 62/739,599, filed on Oct. 1, 2018.

(51) Int. Cl.
*G01M 11/08*    (2006.01)
*G01M 11/00*    (2006.01)
(Continued)

(52) U.S. Cl.
CPC .......... *G01M 11/088* (2013.01); *G01M 11/37* (2013.01); *G01N 29/043* (2013.01);
(Continued)

(58) Field of Classification Search
CPC ............. G01N 29/043; G01N 29/2412; G01N 29/2418; G01N 2291/0231; G01N 19/04; G02B 6/4296; G01M 11/088; G01M 11/37
See application file for complete search history.

(56) References Cited

U.S. PATENT DOCUMENTS

| | | | |
|---|---|---|---|
| 2004/0101008 A1 | 5/2004 | Kurtz et al. | |
| 2004/0146295 A1 | 7/2004 | Furman et al. | |

(Continued)

FOREIGN PATENT DOCUMENTS

| | | | |
|---|---|---|---|
| CN | 106384935 A | * | 2/2017 |
| EP | 0835328 B1 | | 8/2002 |

OTHER PUBLICATIONS

Kalms, Michael et al. "Assessment of bond defects in adhesive joints before and after the treatment with laser generated shock waves". Proc. SPIE 9063, Nondestructive Characterization for Composite Materials, Aerospace Engineering, Civil Infrastructure, and Homeland Security 2014, 906327. (Year: 2014).*

(Continued)

*Primary Examiner* — Michael A Lyons

(57) ABSTRACT

Systems, methods and device provided for combining or splitting laser beams, including a plurality of optical fibers for providing laser beams, an image relay lens for each of the plurality of optical fibers, positioning a prism beam combiner or splitter after the image relay lenses for combining or splitting the laser beams. According to another aspect, the a prism beam combiner or splitter may include a flattened tip to transmit a portion of an input laser beam, a position sensitive detector to receive the transmitted portion of the input laser beam to track a beam axis motion and provide feedback alignment error signals based on the beam axis motion, and a driver to receive the feedback alignment error signals and to drive a motor or piezo actuated beam steering (Continued)

minor based on the feedback alignment error signals, wherein a laser bond inspection method implements the described systems and methods.

17 Claims, 32 Drawing Sheets

(51) Int. Cl.
    *G01N 19/04*     (2006.01)
    *G01N 29/04*     (2006.01)
    *G01N 29/24*     (2006.01)
    *G02B 6/04*     (2006.01)
    *G02B 6/32*     (2006.01)
    *G02B 6/42*     (2006.01)

(52) U.S. Cl.
    CPC ..... *G01N 29/2412* (2013.01); *G01N 29/2418* (2013.01); *G02B 6/04* (2013.01); *G02B 6/4214* (2013.01); *G02B 6/4296* (2013.01); *G01N 19/04* (2013.01); *G01N 2291/0231* (2013.01); *G02B 6/32* (2013.01)

(56) References Cited

U.S. PATENT DOCUMENTS

| | | |
|---|---|---|
| 2005/0120803 A1 | 6/2005 | Sokol et al. |
| 2011/0273609 A1* | 11/2011 | DiFrancesco .......... H04N 23/55 |
| | | 348/360 |
| 2012/0274909 A1 | 11/2012 | Schulz et al. |
| 2016/0054216 A1 | 2/2016 | Sokol et al. |
| 2016/0324403 A1 | 11/2016 | Yeoh et al. |

OTHER PUBLICATIONS

International Search Report and Written Opinion mailed Jan. 2, 2020, for Application No. PCT/US2019/054094 filed Oct. 1, 2019 (11 pages).

\* cited by examiner

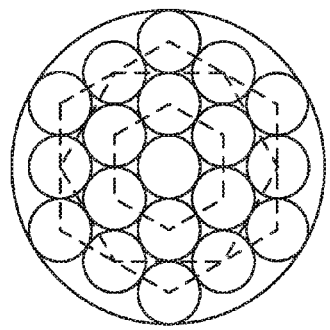
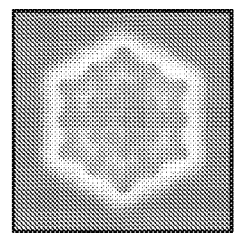
3124
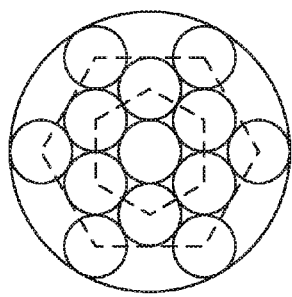
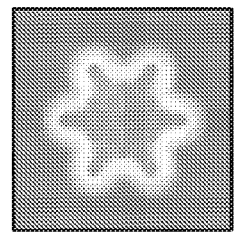
3122
FIG. 37
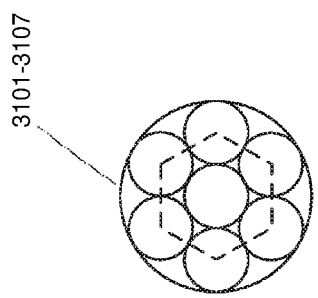
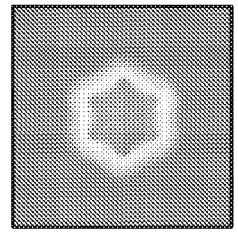
3120

SYSTEMS, METHODS AND APPARATUSES FOR LAUNCHING LASER BEAMS INTO MULTIPLE FIBERS AND/OR COMBINING BEAMS

CROSS-REFERENCE TO RELATED APPLICATIONS/INCORPORATION BY REFERENCE

This disclosure claims priority to and the benefit from U.S. Provisional Patent Application Ser. No. 62/739,599 titled "Systems, Methods and Apparatuses for Launching Laser Beams into Multiple Fibers and/or Combining Beams", filed on Oct. 1, 2018, which is herein incorporated by reference in its entirety.

GOVERNMENT LICENSE RIGHTS

This invention was made with government support under FA8650-17-C-5621 awarded by the United States Air Force. The government has certain rights in the invention.

TECHNICAL FIELD

This disclosure generally relates to methods and apparatus for launching laser beams into multiple fibers, and to methods and apparatus for combining laser beams from multiple fibers to form a single spot for applications such as evaluating bond strength in composite structures.

BACKGROUND

Laser bond inspection (LBI) is a nondestructive inspection method for evaluating adhesive bond strength in composite structures. LBI uses a pulsed laser system to generate a controlled stress wave which proof-tests an adhesive bond. For example, LBI may be used to develop and evaluate manufacturing processes, and to monitor bond integrity throughout the life of a structure. Further reading on LBI apparatuses and methods may be found in issued U.S. Pat. Nos. 7,509,876, 7,770,454, 7,775,122, 8,132,460, 8,156, 811, 9,201,017, 9,525,261, 9,857,288, 10,048,494, 10,365, 479 which are herein incorporated by reference in its entirety.

Laser bond inspection (LBI) when performed with a single laser beam launched into free space, requires a tubular articulated arm to safely confine and deliver the laser beam to an inspection head. The articulated arm is too bulky for confined space LBI such as that encountered for inspection inside of an aircraft wing structure. For confined space LBI, a better approach is to split the single beam into a multiplicity of smaller beams which are launched into a multiplicity of flexible fiber optics. The flexible fiber optics can be grouped into a flexible umbilical cable connected to the inspection head which contains optics to recombine beams from the fiber optics into a single beam spot on the work surface.

BRIEF DESCRIPTION OF THE DRAWINGS

FIG. 37 is a schematic of exemplary irradiance patterns at the work surface for various fiber counts.

DETAILED DESCRIPTION

Figure 1A:
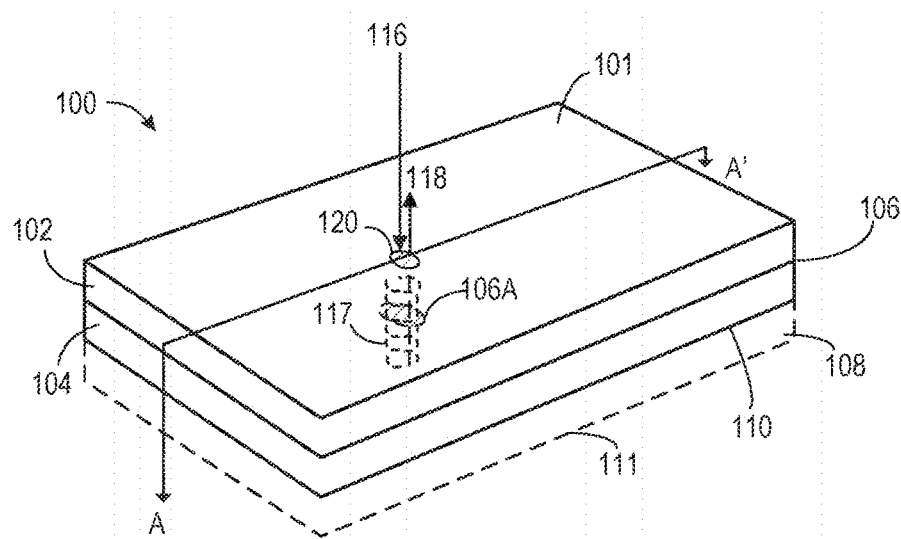
FIG. 1A illustrates an example of applying a beam combining method to interrogate a bonding region in a composite structure in a laser bond inspection (LBI).

To facilitate understanding, various elements with out-of-sequence reference designations may be referred to corresponding drawings in the disclosure.

The disclosure may overcome the problem of confined inspection area by a single beam in a stiff and bulky articulated arm by launching beams into a plurality of flexible fiber optics and merging a plurality of beams (i.e., beam combining technique) from the several fibers to form a single beam spot for LBI. The problem of beam wandering in the launching of beams into the fibers may be overcome by using beam sampling to detect a beam position and a feedback mechanism to correct the beam wandering.

According to some aspects, systems and methods provide for device for combining laser beams, including a plurality of optical fibers for providing laser beams, an image relay lens for each of the plurality of optical fibers, and a prism beam combiner positioned after the image relay lenses for combining the laser beams.

According to another aspect, systems and methods provide for device for splitting laser beams, including a prism to split an input laser beam and a lenslet array positioned before the prism to condition the split laser beams to launch homogenized beamlets into multiple fibers.

According to another aspect, systems and methods provide for apparatus to adjust for beam wander, including a beam splitting prism including a tip, where the tip is flattened to transmit a portion of an input laser beam, a position sensitive detector to receive the transmitted portion of the input laser beam to track a beam axis motion and provide feedback alignment error signals based on the beam axis motion, and a driver to receive the feedback alignment error signals and to drive a motor or piezo actuated beam steering mirror based on the feedback alignment error signals.

Other systems, methods, features, and advantages is or can become apparent upon examination of the following figures and detailed description. It is intended that all such additional systems, methods, features, and advantages be included within this description and be protected by the accompanying claims.

Both civilian and military aircrafts increasingly include a growing use of carbon-fiber-reinforced-polymer (CFRP) composite materials to form a composite structure with bonded layers (such as an aircraft wing). Bonded joints between layers if failed, may weaken the overall strength of the composite structure resulting in breakage or peeling when subjected under severe mechanical stress such as in flight condition. At present there is only one method capable for validating bond strength, namely LBI, developed at LSP Technologies, Inc., under the U.S. Air Force Research Laboratory Composite Affordability Initiative program. The LBI may interrogate a strength of bonded joints (i.e., an interface or a junction bonded between two different parts or different material layers) in a nondestructive fashion. LBI may also detect the presence of weak bonded regions in adhesive bonds between different materials layers that can lead to bond failure. In brief, there is a need for developing a flexible beam delivery system and an inspection head for LBI that is compact, lightweight, and capable of delivering sufficient pulse energy for LBI.

Figure 6:
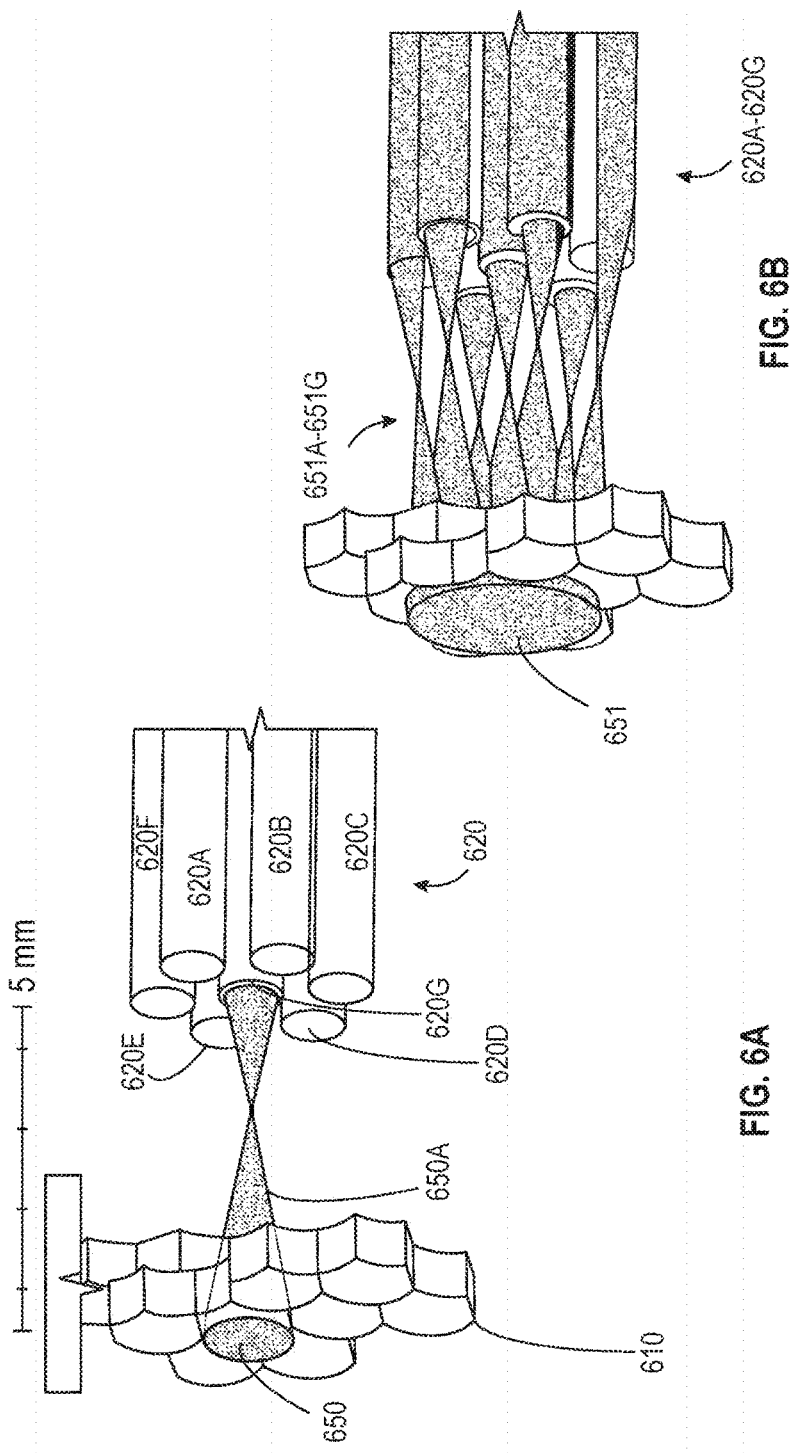
FIGS. 6A, B are schematics of an exemplary lenslet array and fiber array for direct launch of beamlets into a matched single fiber and an array of fibers.

The disclosure provides examples of merging multiple beams from a bundle of optical fibers (3101-3107 in FIG. 37) to form a single beam spot (3120 in FIG. 37) covering a larger area (3122 in FIG. 37) for delivery by an inspection head (see FIGS. 31-36) for laser bond inspection (LBI). The disclosure also provides examples of different configurations of inspection heads (3100A to 3100D in FIGS. 34-36) which are compact and light weight for ease of handling by an operator working in a confined space such as to inspect composite surfaces inside an aircraft wing structure or to inspect composite structures having a tight geometry. The disclosure also provides examples of using a lenslet array (such as a hexagonal lenslet array 360 in FIG. 4) with a short focal length objective lens 370 (see FIG. 4) to enhance energy transmission capacity in single fibers such as 1.5-mm core fibers or other sized fibers (see FIGS. 3-4) or directing beams into a bundle of optical fibers (see FIG. 6).

Figure 11:
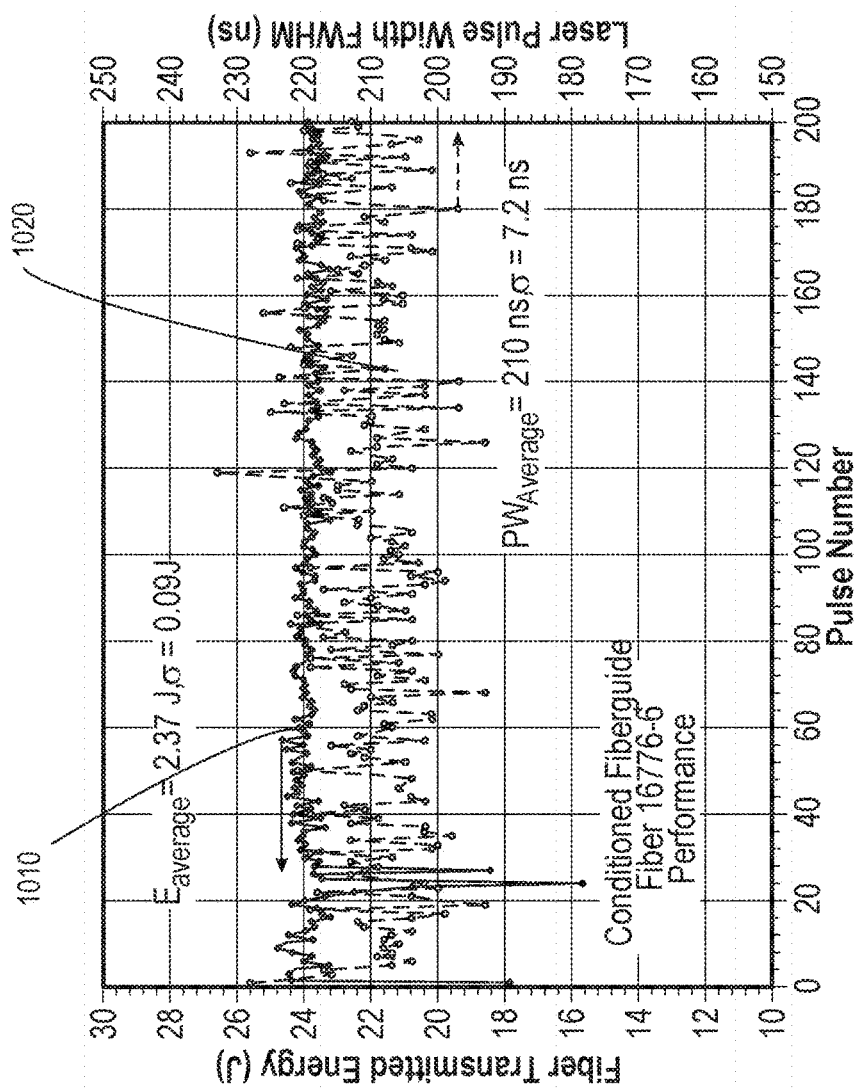
FIG. 11 is a graph of an exemplary transmitted pulse energy and pulse width.

In some examples, 2.5 J per pulse transmission for around 200-ns pulse width may be achieved (see FIG. 11). The disclosure provides examples of using a dual lenslet to launch laser beams into a 2.0-mm core diameter fiber to transmit beams with an average of 3.7 J per pulse at 200-ns pulse width in a 1000 pulse endurance run without causing damage to the fiber or the end cap connector, for subsequent merging to form a large beam spot for delivery in LBI applications.

Figure 3:
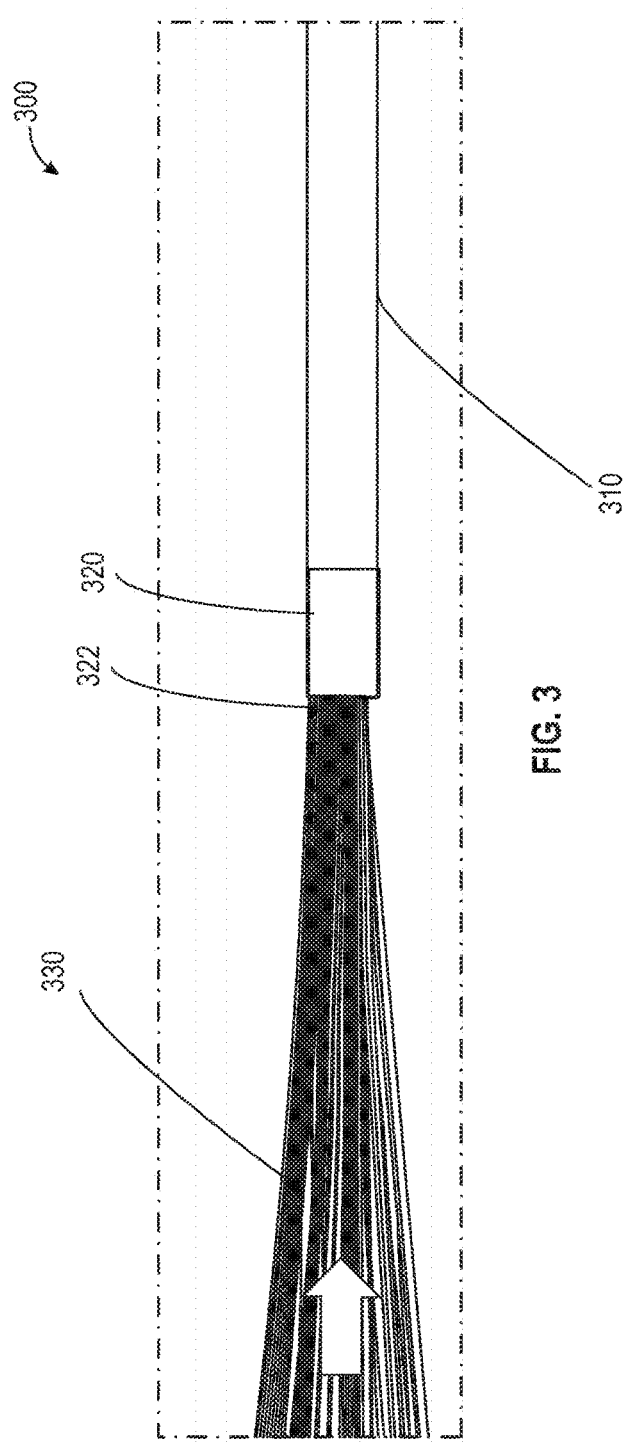
FIG. 3 depicts a formation of a single-fiber beam converged from lenslet array conditioned beamlets.
Figure 4:
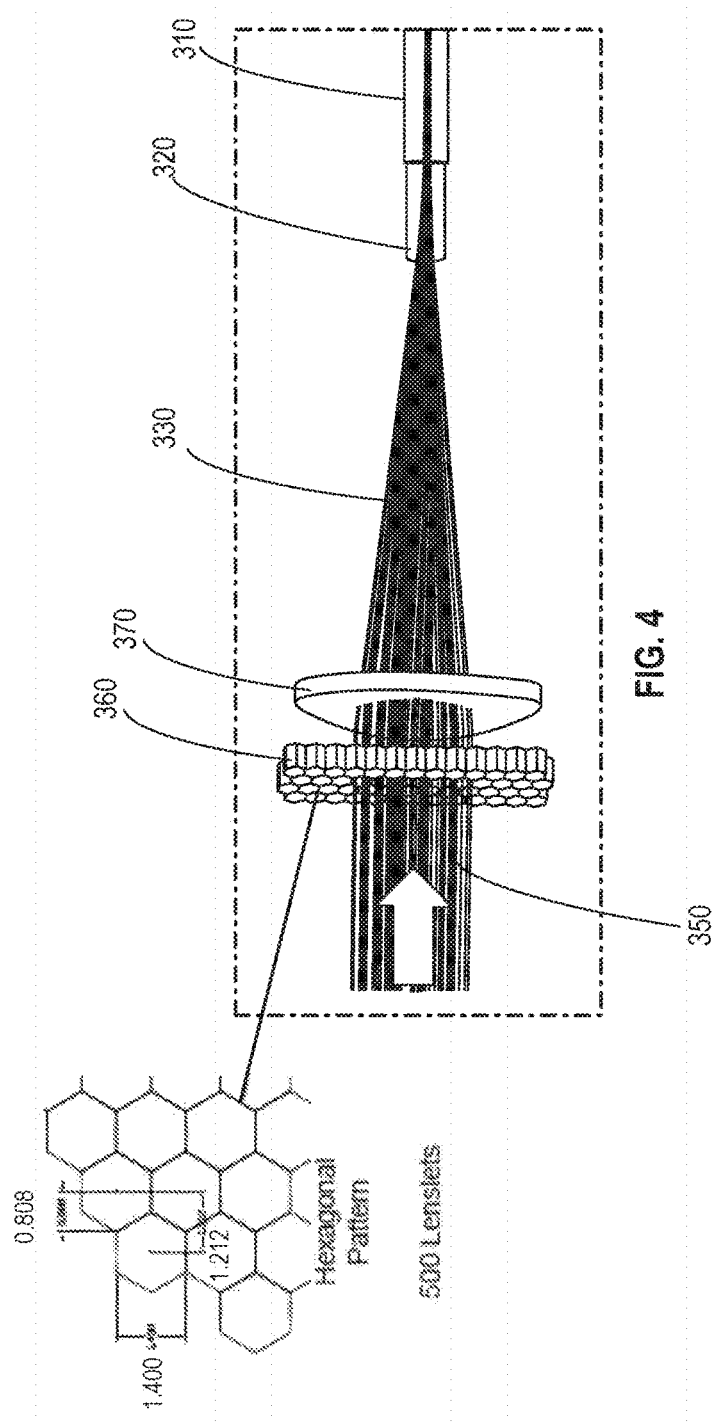
FIG. 4 is a schematic showing a ray trace through an exemplary hexagonal lenslet array and objective lens prior to beam convergence in FIG. 3.

The disclosure provides examples of employing an alternate beam launching approach of directly launching from a lenslet array to a matching fiber array (see FIGS. 3-4). Ray traces were performed to confirm a feasibility of this approach to reduce mechanical and electronic complexity of the beam launching system. A design for a 7-fiber umbilical conduit assembly will be later described, including input connector, flexible fiber umbilical conduit, and output connector suitable for attachment to an inspection head (see FIG. 31). Other higher numbers of fibers may also be used.

FIG. 1A illustrates an example of applying a beam combining method to interrogate a bonding region in a composite structure 100 in a laser bond inspection (LBI). The composite structure 100 may be formed by at least two separate layers (102, 104) bonded together by an adhesive at a bond interface 106. For example, the first layer 102 and the second layer 104 may each be composite layers of a same composite material, or may be composite layers of different composite materials. Alternately, the first layer 102 and the second layer 104 may each be layers of non-composite materials, or a combination of a layer of composite material and a layer of non-composite material. Examples of composite materials may comprise any one of: carbon-fiber-reinforced-polymer (CFRP), epoxy graphite fiber or any materials which are of composite nature. Examples of non-composite materials may comprise anyone of: radio frequency (RF) wave absorptive material, thermal protective coating, a dielectric material, metal, alloys, metallic coated films, or any materials which are of non-composite nature. Yet in another example, the composite structure 100 may be formed by three separate layer (102, 104, 108) having respective bond interfaces (106, 110).

Referring to FIG. 1A, a combined beam of a plurality of laser beams 116 (i.e., collimated beams in pulses) forming a beam size region 120 may be directed to a top surface 101 of the composite structure 100 to interrogate an integrity of a bonding region 106A having similar beam size region 120 at the bond interface 106. Although not shown in FIG. 1A for clarity sake (but shown in FIG. 1B), it is customary in LBI that the top surface 101 of at least the beam size region 120 may be masked with an adhesive tape 112 (preferably black color maximum light absorption), upon which water 114 may be injected through a nozzle (not shown) which is proximal to an inspection head (see FIGS. 31-36), while laser beams 116 are applied (i.e., collimated beams in pulses) through a layer of water 114 onto a surface of the tape 112.

Figure 1B:
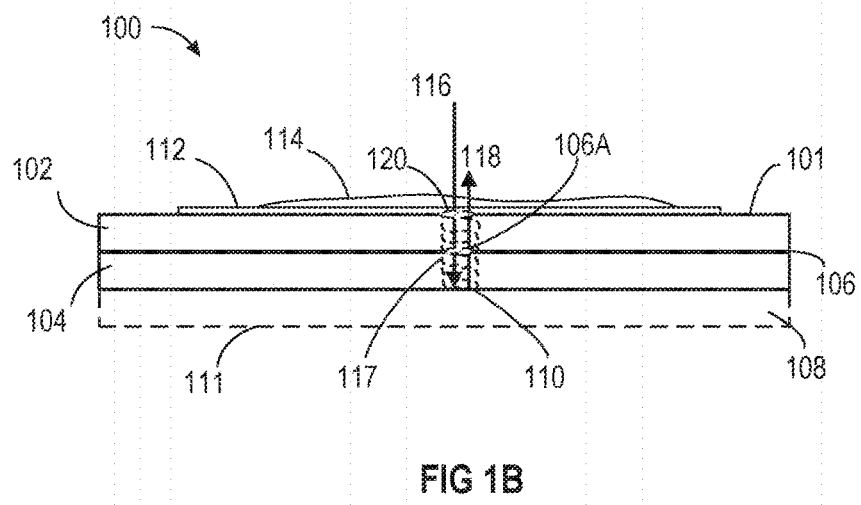
FIG. 1B illustrates a sectional view A-A' of the interrogation of the bonding region in the composite structure, as shown in FIG. 1A.

FIG. 1B illustrates a sectional view A-A' of the interrogation of the bonding region 106A in the composite structure 100, as shown in FIG. 1A. Laser beams 116 (i.e., collimated beams in pulses) travels through the water 114 which on one hand being transparent to the laser beams 116, yet the water 114 on the other hand functions as a tamp to contain and to apply hydrostatic pressure to an energy path of the to the beam size region 120, in order that the laser beams 116 heats up and partially evaporates the material of adhesive tape 112 at the beam size region 120 to trigger an explosion of plasma to generate a compressive acoustic shock wave 117, which propagates through the composite materials of the first layer 102, the bonding region 106A and through the composite materials of the second layer 104 until reaching a back free surface 110 (i.e., terminal surface of the composite structure 100) of the second layer 104 (last layer) which bounces back an acoustic wave as a reflected response 118 to travel in an opposite direction through the second layer 104, the interface 106 and the first layer 102 which emerges the surface 101 to be detected by an electromagnetic acoustic transducer (EMAT) sensor (see FIGS. 33-36) for evaluation of the integrity of the bonding region 106A at the interface 106.

For a composite structure 100 having more than two layers (such as having a third layer 108 or more), the LBI method in likewise interrogate the bond integrity of all the intervening interfaces (i.e., 106, 110) between the first layer 102 and the last layer 108.

Although water 114 is described as a preferred transparent medium (for minimal cleanup effort) to the laser beam may be injected onto the surface of the adhesive tape 112, other transparent liquids such as mineral oils or liquids transparent with sufficiently high specific gravity may also be used.

It should be mentioned that different composite materials with different thicknesses and different adhesives may exhibit a wide range of response in LBI, a baseline calibration test is therefore carried out and stored into a database for reference prior to conducting an actual interrogation of the bonding region 106A. A baseline calibration may follow a low-high-low energy level calibration sequence on a representative composite sample part to establish an upper limit of energy level that breaks the bonding interface. For example, a representative composite sample part may initially be interrogated by laser beams 116 at an initial low energy level of a defined energy per pulse over a defined pulse width for a defined number of pulses. The energy level of the laser beams 116 may be adjusted higher and higher through raising one or a combination of an intensity and a pulse width. The reflected response is monitored by the EMAT sensor in the inspection head which is displayed as a trace on a scope to record the reflected response until reaching the energy level sufficient to break the adhesive bond to establish an energy threshold as shown on the trace output by the EMAT sensor. Afterwards, a low energy level may be resumed to compare the prior traces at a low energy level. A broken adhesive bond at the interface may show a difference on the reflected trace on the EMAT sensor. Once the energy level of a bond breakdown threshold is identified, an actual composite structure 100 may be tested at an energy level at a certain percentages below the threshold energy (such as at 50% of the threshold) to allow a safety margin before reaching a destructive energy level while ensuring bond integrity is sufficient.

Figure 2:
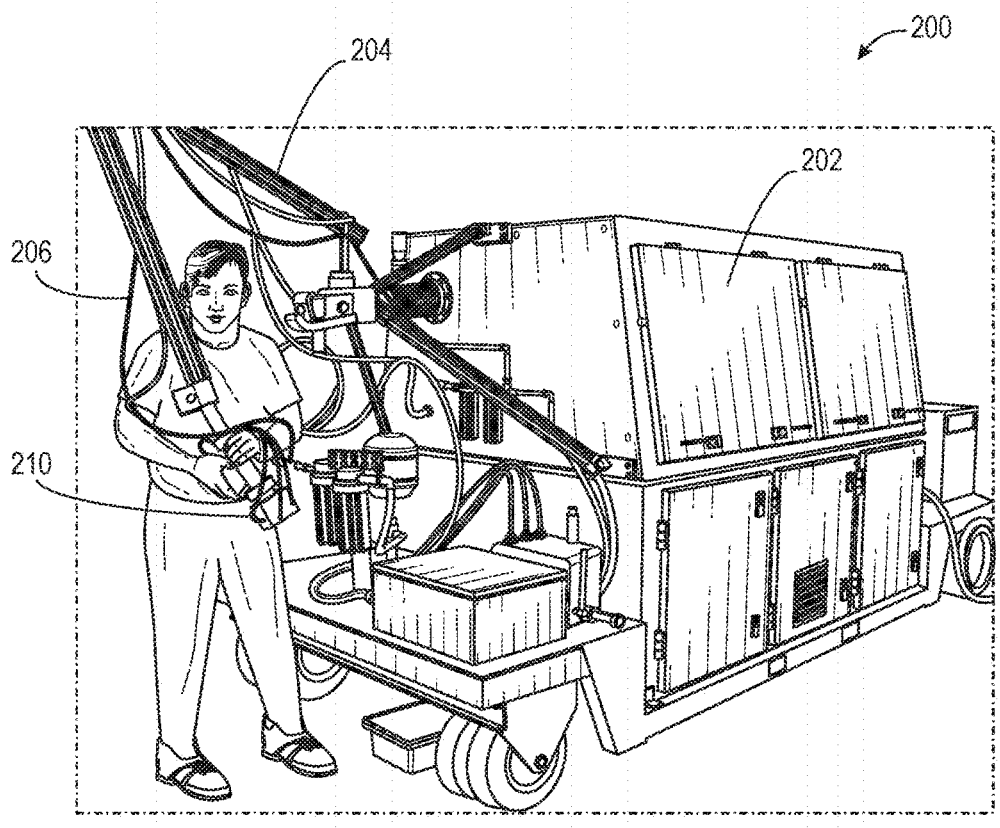
FIG. 2 illustrates an example of an eye-safe mobile laser bond inspection system.

FIG. 2 illustrates an exemplary eye-safe mobile laser bond inspection (LBI) system 200. The LBI system 200 uses a highly-controlled laser pulse to produce a compressive stress wave 117 (see FIGS. 1A, B) that is transmitted into a composite structure 100 (see FIG. 1A, B). After a reflection response from the back free wall 110 (see FIGS. 1A, B) of the composite structure, the reflective response 118 (tensile wave) indicates or evaluates the integrity or strength of the bond interface 106 at the bonding region 106A. The magnitude of the stress wave is tailored to the material and adhesive system under investigation. No heating occurs in the material during the LBI testing.

In some examples, the LBI system 200 incorporates a modular design approach. The system 200 (see FIG. 2) includes an enclosure which houses the laser system 202 with its power supplies, controls and optics; an inspection head 210, which delivers laser energy to the material and measures the reflection response 118 through an electromagnetic acoustic transducer (EMAT) sensor 3700 (see FIG. 33). The head inspection head 210 is attached to an articulated beam delivery arm 204 which transmits the laser energy through a fiber optic bundle 206 from the laser system to the inspection head 210. The LBI system is currently at TRL-5 (Technical Response Level 5).

In another example, a TRL-7 (Technical Response Level 7) system may demonstrate delivery of laser energy to a laser bond inspection head 3100 using an umbilical cord 3300 of fiber optic bundle that replaces the articulated arm 204. This may extend the reach of LBI system 200, e.g., distance of laser system 202 to the composite structure 100, and increase flexibility in accessing structural inspection points. For the sake of explanation, the laser system 202 can provide 15-20 Joules of energy in a 100-300 ns laser pulse, through an umbilical cord 3300 consisting of 7 fibers of at least 5 m long. Other numbers of fibers and lengths may be used, e.g., up to 19 or more fibers having lengths up to 30 m or more.

FIGS. 3-4 depicts a formation of a single-fiber beam 310 converged from lenslet array conditioned beamlets 330. Lenslet arrays 360 used in combination with an objective lens 370 can reduce the likelihood of gas breakdown and provide a more uniform beam profile at the fiber face. FIG. 3 presents a ray trace 330 illustrating the effect of a lenslet array 360 placed in front of the focusing lens 370 (100 mm focal length for this case). This approach may be effective for single fibers 310 as discussed subsequently.

FIG. 4 is a schematic showing a collimated ray trace 350 through an exemplary hexagonal lenslet array 360 and objective lens 370 prior to beam convergence 330 in FIG. 3. FIG. 4 is a schematic showing a ray trace 350 through an exemplary hexagonal lenslet array 360 and objective lens 370 prior to beam convergence 330 in FIG. 4.

Figure 5:
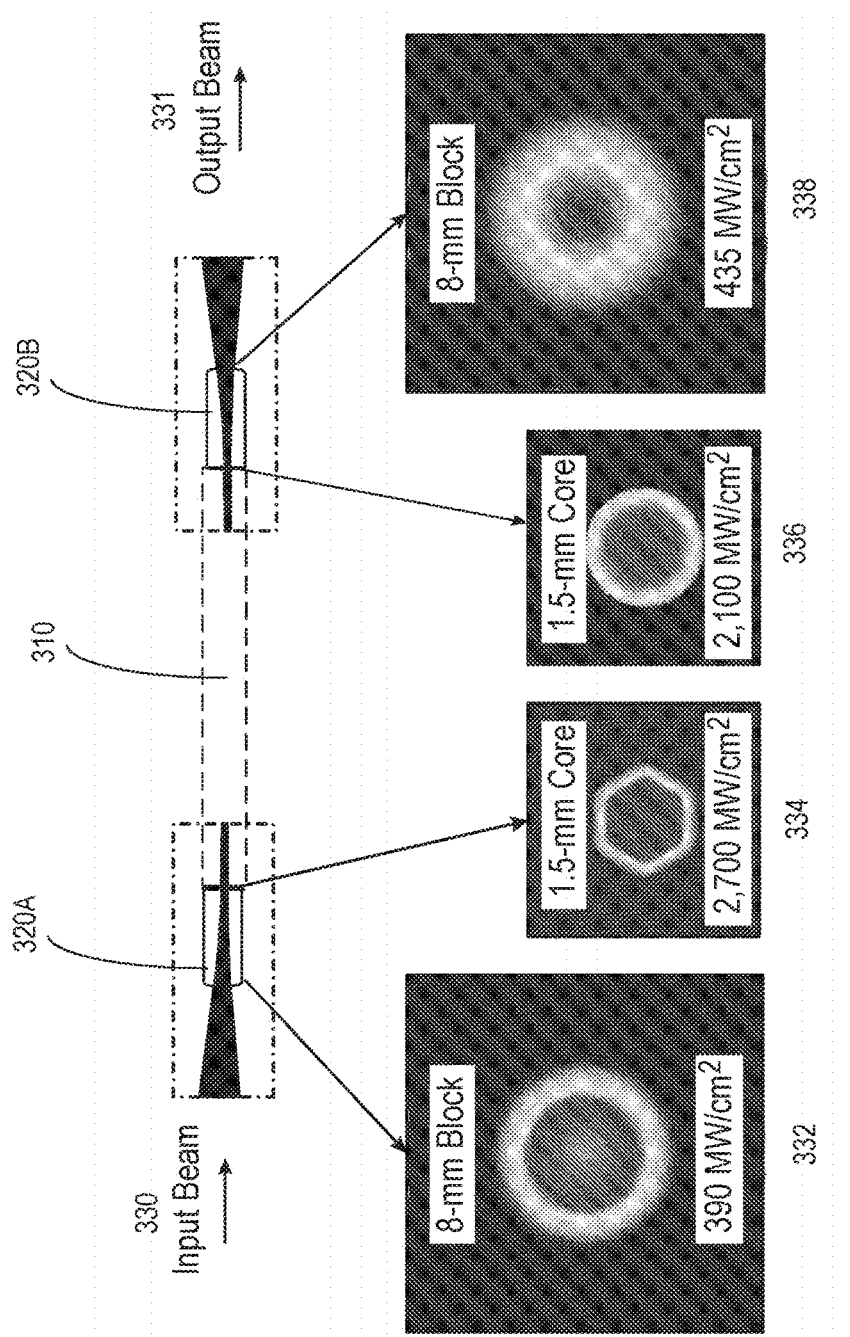
FIG. 5 is a schematic of exemplary irradiance profiles in fiber with end caps using a hexagonal lenslet array.

FIG. 5 illustrates a schematic of exemplary respective irradiance profiles (332, 334, 336, 338) using a hexagonal lenslet array 360 into a fiber 310, namely at an entrance of the end cap 320A, after the end cap 320A, after traveling through the fiber 310 at the second end cap 320B, and exiting the second end cap 320B. End caps 320A, B may be fused to a high-power silica fiber 310 and have been used for several years in high-power continuous fiber lasers, such as those manufactured by IPG Photonics, to reduce the likelihood of fiber damage. Damage typically occurs at the glass/air interface of the fiber. The end cap 310 translates this location to a lower irradiance position at the entrance to the end cap 320A. This technique may be used for pulsed laser applications as well and is applicable to direct launch or lenslet array conditioned launch into a fiber core 310.

FIGS. 6A, B are schematics of an exemplary lenslet array 610 and fiber array 620 for direct launch of beamlets into a matched single fiber and an array of fibers without end caps. FIG. 6B is a schematic of an exemplary lenslet array 610 and fiber array 620 for direct launch of beamlets 651A-651G into a matched array of fibers 620A-620G without using an objective lens. In this approach, the beam 650 from the laser passes through a lenslet array 610 which generates beamlets that are launched directly into aligned fibers 620A-620G. In FIG. 6B, the raw collimated (or homogenized) beam 650 from the laser passes through the lenslet array 610 and forms a beamlet 651A-651G for every lenslet. These beamlets converge to a waist at a location determined by the lenslet focal length. After passing through the waist the beamlet expands to partially fill the input face of the adjacent fiber 621A to 621B. A benefit of this approach is the simplicity of the mechanics relative to launching split beams into a collection of individual fibers.

In some examples, fiber preparation may be designed to minimize laser pulse damage to the fiber. An additional measure is to homogenize the laser beam profile at the entrance to the fiber core to eliminate peaks in the irradiance profile that occur normally. A lenslet array used in combination with an objective lens of appropriate focal length may be used to produce a uniform irradiance profile at the fiber entrance face as illustrated in FIG. 5 for hexagonal shaped lenslets. The lenslet arrays are fabricated in fused silica wafers by photolithography and reactive ion etching.

Figure 7:
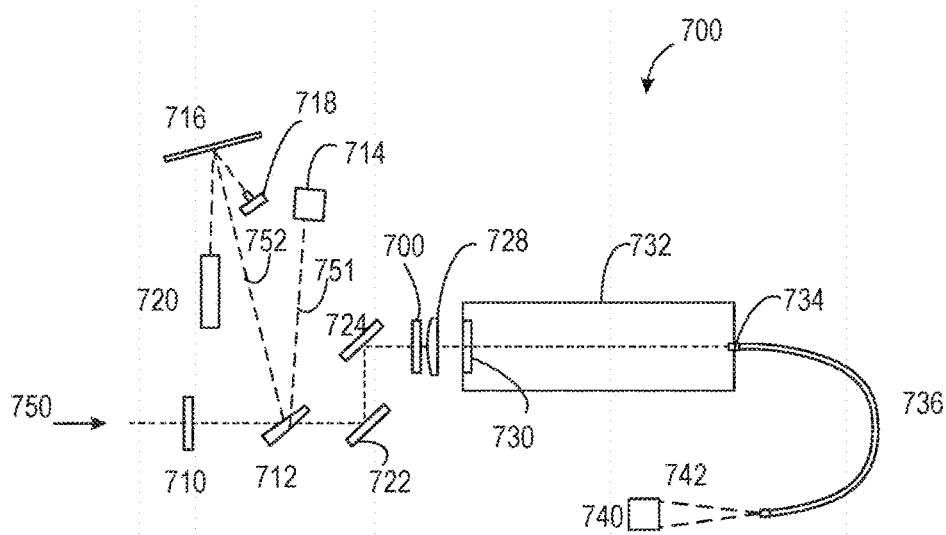
FIG. 7 is a schematic of an exemplary test bed setup for fiber durability test.
Figure 8:
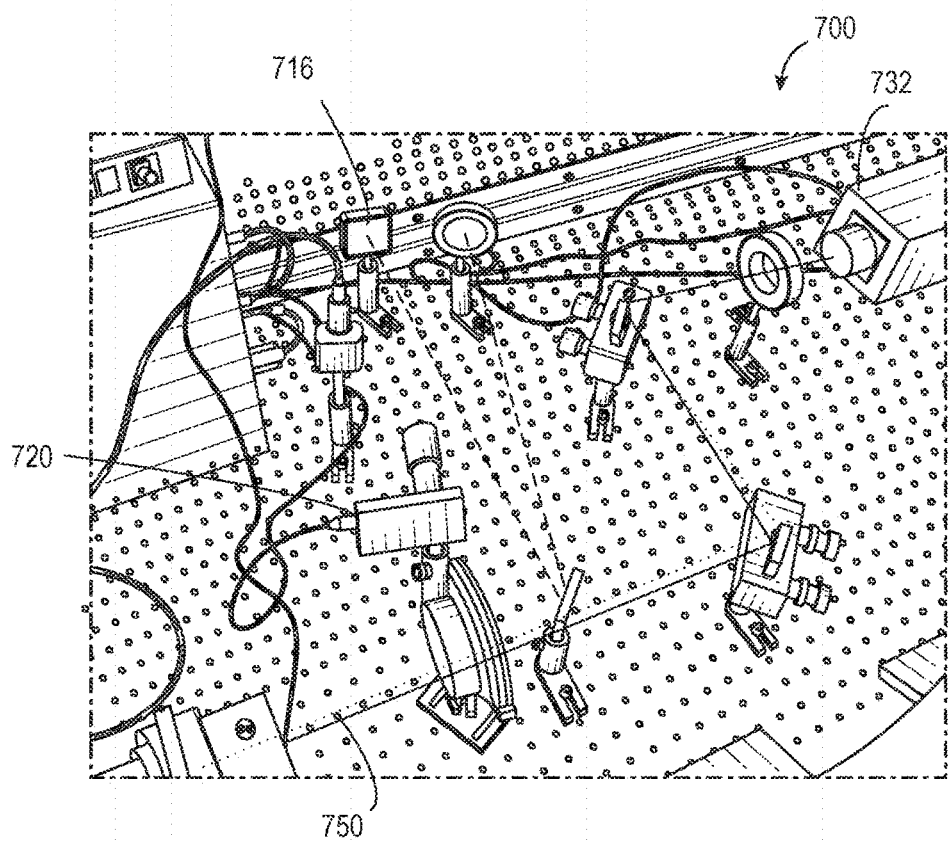
FIG. 8 is an exemplary physical setup of an assembled test bed input beam diagnostic section.

FIGS. 7-8 are schematic of an exemplary test bed setup 700 for fiber durability tests. Measurements of pulse energy transmitted through fibers were performed. The laser beam pulse 750 enters from the left and passes through an attenuator 710 which is used to adjust the pulse energy sent to the test bed. An uncoated wedge window beam sampler 712 splits off two low energy beams 751-752 for diagnostic purposes, each beam having about 3.5 percent of the energy in the main beam. One diagnostic beam 751 is sent to an energy probe (Coherent EnergyMax-USB J-50 MB-LE) 714 and the other 752 sent to a high-reflectance scatter plate (Spectralon Model SRT-99-020, 2-inch by 2-inch) 716. The pulse temporal profile is measured with a photodiode (Thorlabs DET10A) 718 receiving backscattered light from the scatter plate 716 and the pulse spatial profile is measured with a camera (Spiricon Model SP 503U) 720 imaging the scatter plate with a custom lens. The main beam is directed to the beam shaping optics via two beam steering mirrors 722, 724.

FIG. 8 is an exemplary physical setup of an assembled test bed input beam diagnostic section. Solid lines indicate the path of the main beam. Laser tests on optical fibers were conducted using the lenslet array beam conditioning approach.

Figure 9:
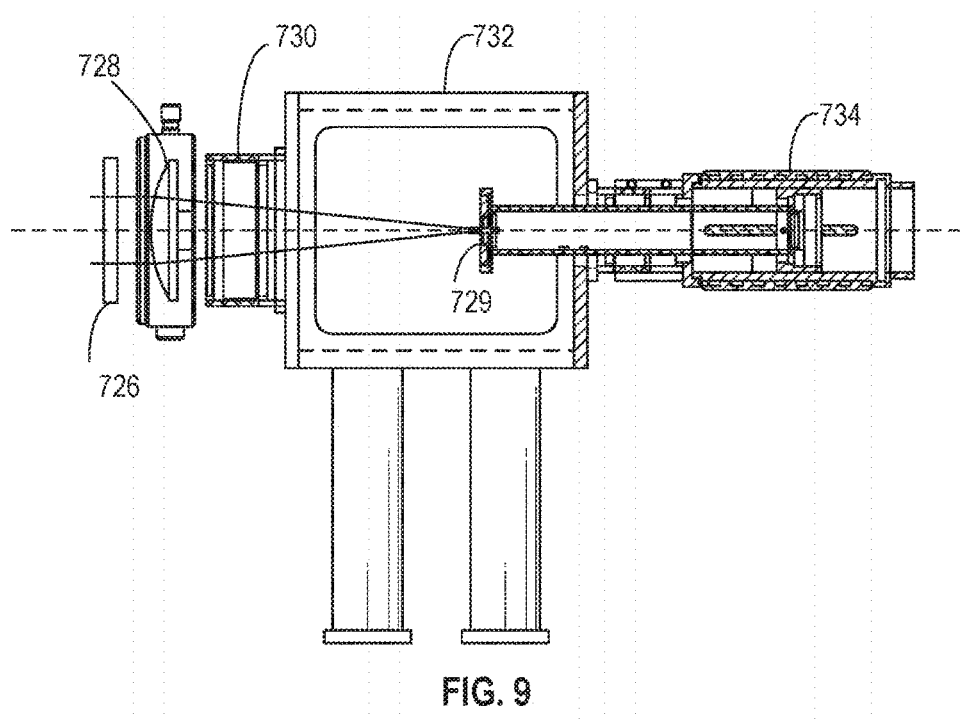
FIG. 9 is a diagram of an exemplary environmental chamber designed to test fibers with the lenslet array conditioned beams.

FIG. 9 is a diagram of an exemplary environmental chamber 732 designed to test fibers with the lenslet array conditioned beams. The lenslet array 726 or microlens array (MLA) has been shown to be effective for conditioning laser beams for launch into fiber optics. The MLA acts to integrate the beam to produce a uniform irradiance pattern at the input fiber face 729.

Figure 10A:
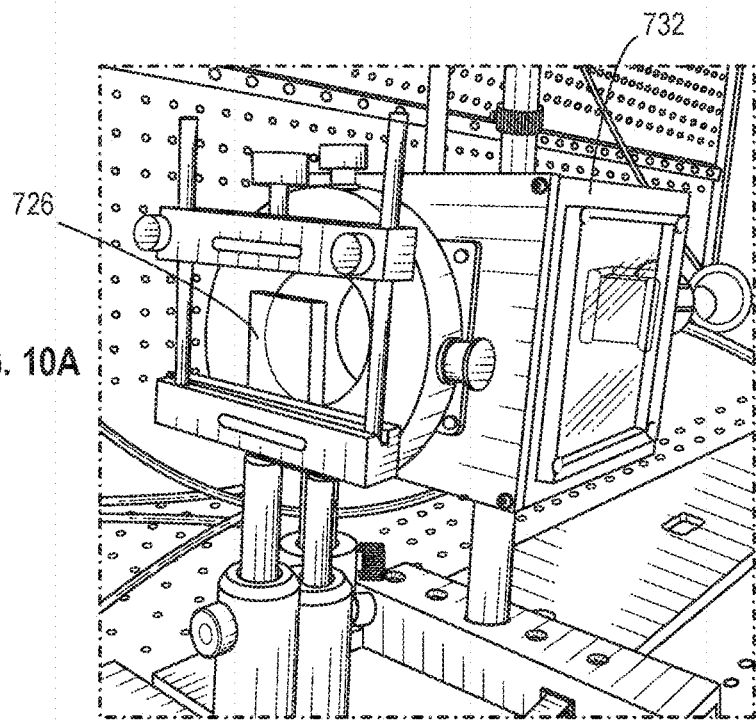
FIGS. 10A, B illustrate exemplary physical lenslet array beam conditioning setup as implemented on the test bed.
Figure 10B:
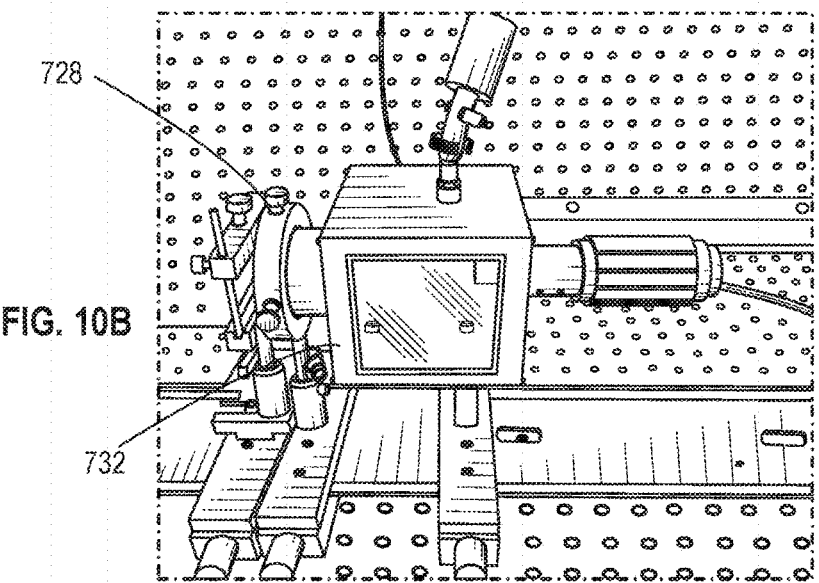

FIGS. 10A, B illustrate exemplary physical lenslet array beam conditioning setup as implemented on the test bed. FIG. 11 is a graph of an exemplary transmitted pulse energy and pulse width.

In the setup, a lenslet array 726 is followed by an objective lens 730 of nominal focal length 100 mm (actual focal length at 1054 nm was 113 mm). A fiber connector holder 734 with precision axial adjustment was used to position the fiber face at the objective lens focal plane. Paper burns may be used to locate the focal plane and to provide confirmation of lateral beam adjustment to the center of the fiber face. Following alignment, a series of 1.5-mm core fibers were tested with the single lenslet array beam conditioning test setup. The pulse width for these tests was nominally 200 ns FWHM. Table 1 presents the exemplary results of these tests.

In some examples, after testing of the first two fibers (which damaged), the beam alignment procedure was improved. The improvement included launching a low energy beam into the fiber and adjusting the lateral location of the fiber to maximize the transmitted energy. This approach led to the ability to transmit higher energy per pulse than was observed in prior research programs. As noted in Table 1, pulse energies in the 2.3 to 2.5 J range may be routinely transmitted for significant numbers of pulses without damage.

Hundreds of pulses may be transmitted at lower pulse energy to "condition" the fiber. The damage on Fiber 16776-8 at 2.3 J was not catastrophic but appeared to be the result of nitrogen plasma initiation which absorbed the beam and limited the extent of the fiber face damage. The initiation source could have been dust particles. In the case of Fiber 16776-9, 200 pulses may be transmitted at 1.94 J without damage and the energy was inadvertently increased to 2.7 J which damaged the fiber face.

TABLE 1

Test results for launching single lenslet array
conditioned beams into 1.5-mm core fiber optics

| Fiber No. | Supplier | No. of Conditioning Pulses and Energy (J) | Highest Transmitted Avg. Energy (J) | No. Pulses at Highest Transmitted Avg. Energy | Failure Mode |
|---|---|---|---|---|---|
| 16505-2 | Fiberguide LP | 180 | 1.47 | 30 | Front fiber protrusion shattered at 2.4 J input |
| 16505-3 | Fiberguide LP | 180 | 1.37 | 30 | Front fiber broke at base at 2.2 J input |
| Introduced active final alignment of fiber (adjust for peak transmission at low energy) | | | | | |
| 16505-4 | Fiberguide LP | 220(low) +300(1.44) +300(1.89) | 2.17 | 50 | No damage |
| 16776-5 | Fiberguide LP | 150(low) +300(1.83) +200(2.31) | 2.54 | 30 | No damage |
| 16776-6 | Fiberguide LP | 180(low) +300(1.76) +300(2.00) | 2.37 | 200 | No damage |
| 16776-8 | Fiberguide LP | 180(low) +200(1.67) +200(1.96) | 2.33 | 53 | "Sparking" and local input fiber face damage |
| 16776-9 | Fiberguide LP | 180(low) +200(1.94) | ≈2.7 Incident | ≈50 | "Sparking" on input fiber face |

Figure 12:
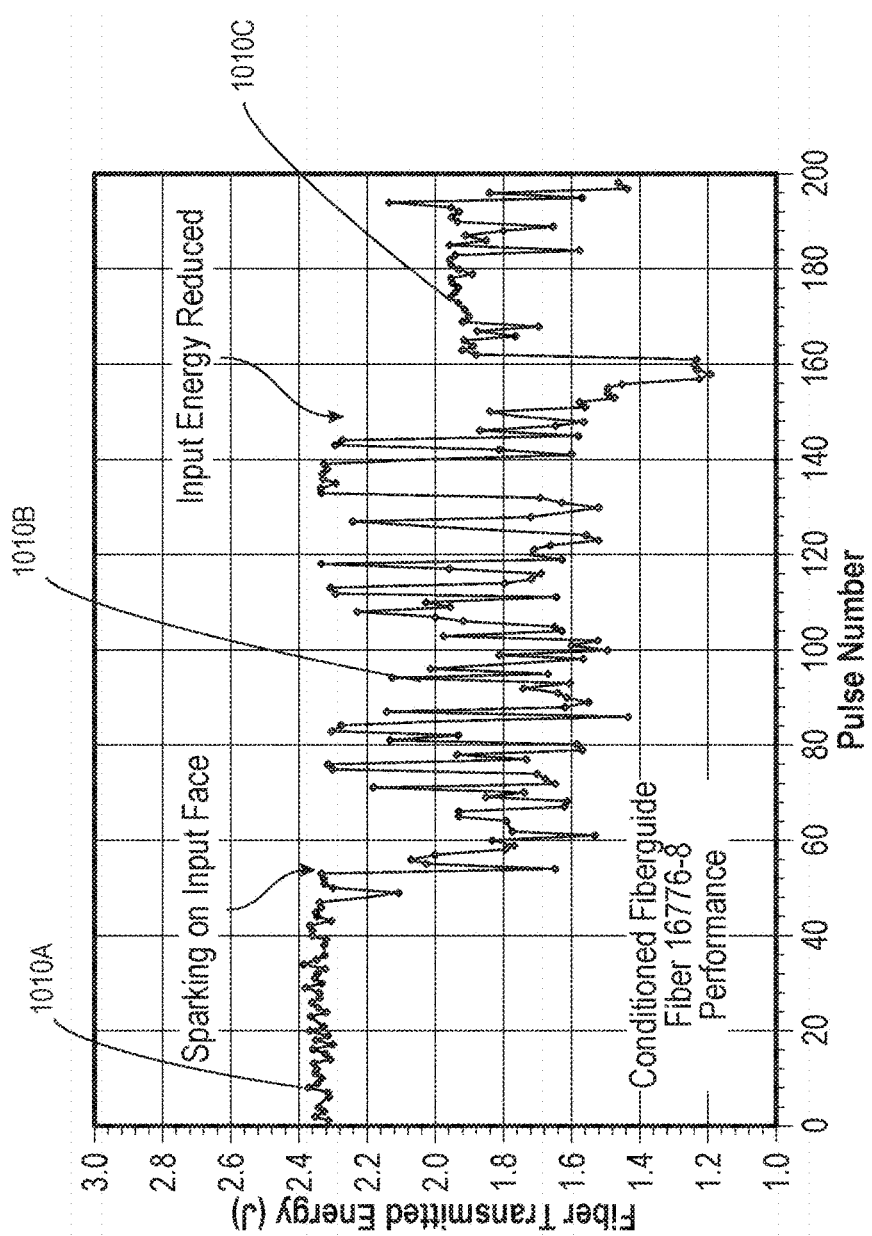
FIG. 12 is a graph of an exemplary transmitted energy.

FIG. 11 is a graph of an exemplary transmitted pulse energy 1010 and pulse width 1020 for a Fiber 16776-6 as a function of pulse number where no damage was observed. FIG. 12 is a graph of an exemplary transmitted energy 1010a measured for a Fiber16776-8, where plasma blocking of transmitted beam energy 1010b began at Pulse 49. In some examples, full recovery of transmitted pulse energy 1010c occurred temporarily at Pulse 133.

Figure 13:
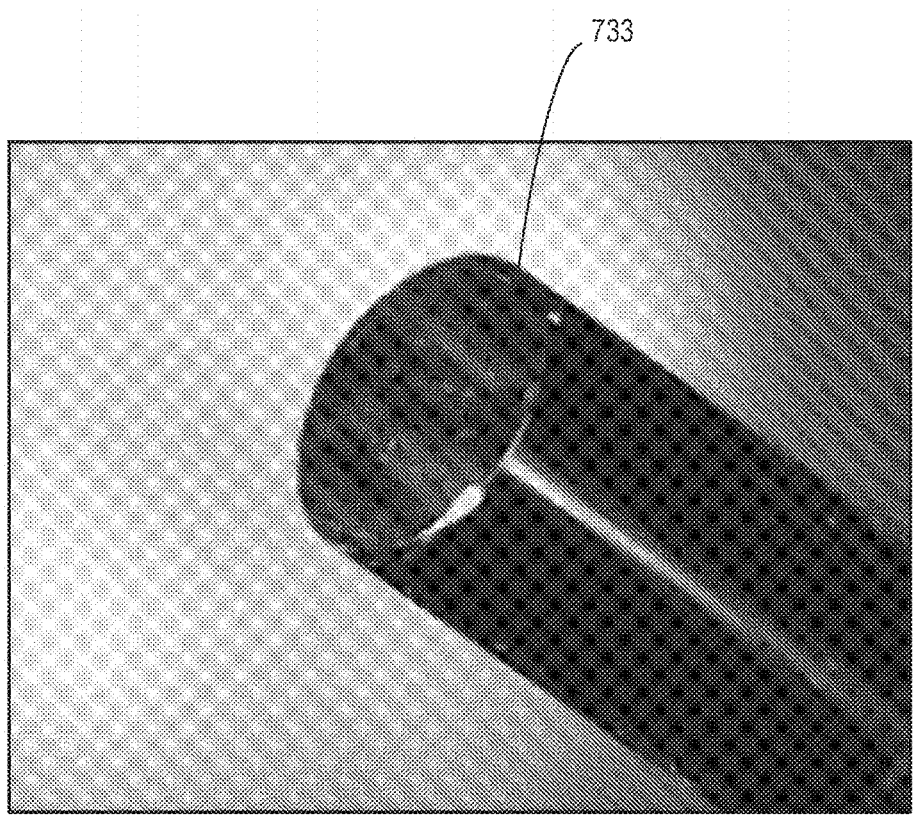
FIG. 13 illustrates exemplary damage on input face of a fiber after intermittent nitrogen gas breakdown.

FIG. 13 illustrates exemplary damage on input face 733 of Fiberguide Fiber 16776-8 after intermittent nitrogen gas breakdown. This behavior suggests that dust particles may have been present that initiated plasma near the fiber face. The slight damage to the input fiber face is shown in the image of FIG. 13. This damage may not be acceptable for long term fiber use but is indicative of the laser effect observed.

The test setup of FIG. 9 may be employed to apply laser pulses to a Fiberguide 1.5-mm core fiber with end caps, which in some examples are fused-silica cylinders fused to the ends of the fiber. The air/glass interface may be moved to a location in the beam where the irradiance is lower as illustrated in FIG. 5. Table 2 presents exemplary results of tests conducted with this fiber. After 320 conditioning pulses at low energies, the fiber was able to transmit 2 J for 200 pulses without damage.

TABLE 2

Test results for launching single lenslet array conditioned
beams into 1.5-mm core fiber optic with end caps.

| Fiber No. | Supplier | No. of Conditioning Pulses and Energy (J) | Highest Transmitted Avg. Energy (J) | No. Pulses at Highest Transmitted Avg. Energy | Failure Mode |
|---|---|---|---|---|---|
| 23438-AR-1 | Fiberguide | 320(low) | 2.05 | 200 | Output end cap blew off at 3.1 J |

Figure 14:
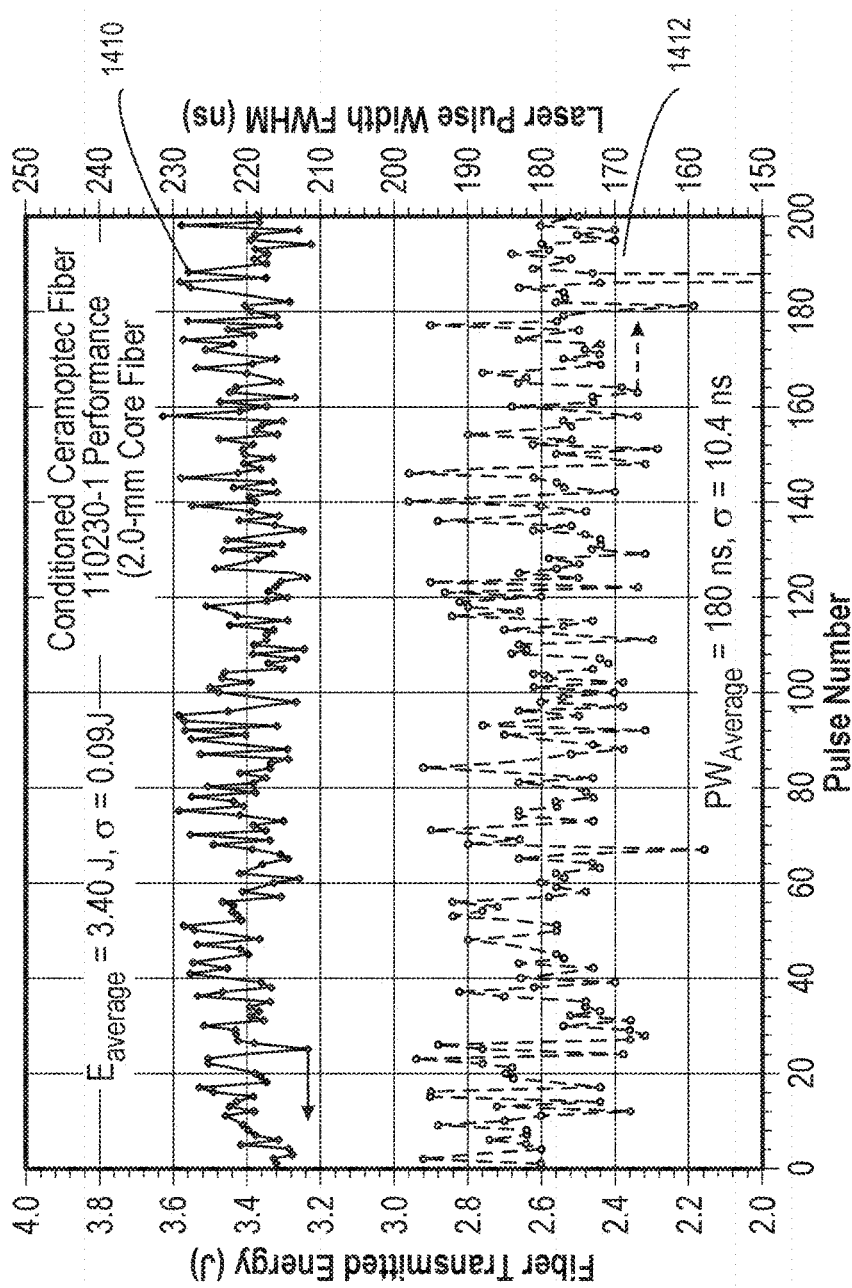
FIG. 14 is a graph of an exemplary transmitted pulse energy and pulse width.

FIG. 14 is a graph of an exemplary transmitted pulse energy and pulse width for Ceramoptec Fiber 110230-1. The test setup of FIG. 9 may be modified by replacing the 100-mm nominal focal length lens with a 150-mm nominal focal length lens to obtain a larger focal spot at a 2.0-mm diameter core fiber. Laser tests may be conducted with 2.0-mm core fibers from Ceramoptec. Table 3 presents the results of the exemplary tests. FIG. 14 illustrates the transmitted pulse energy and pulse width as a function of pulse number for the better performing fiber. The good transmission was achieved with average pulse width shorter than 200 ns, e.g., as shown.

TABLE 3

Test results for launching single lenslet array conditioned beams into 2.0-mm core fiber optics

| Fiber No. | Supplier | No. of Conditioning Pulses and Energy (J) | Highest Transmitted Avg. Energy (J) | No. Pulses at Highest Transmitted Avg. Energy | Failure Mode |
|---|---|---|---|---|---|
| 110230-1 | Ceramoptec | 180(low) +200(2.75) | 3.49 | 200 | No damage |
| 110230-3 | Ceramoptec | 150(low) +200(1.75) | 2.47 | 200 | Slight damage on output face |

Figure 15:
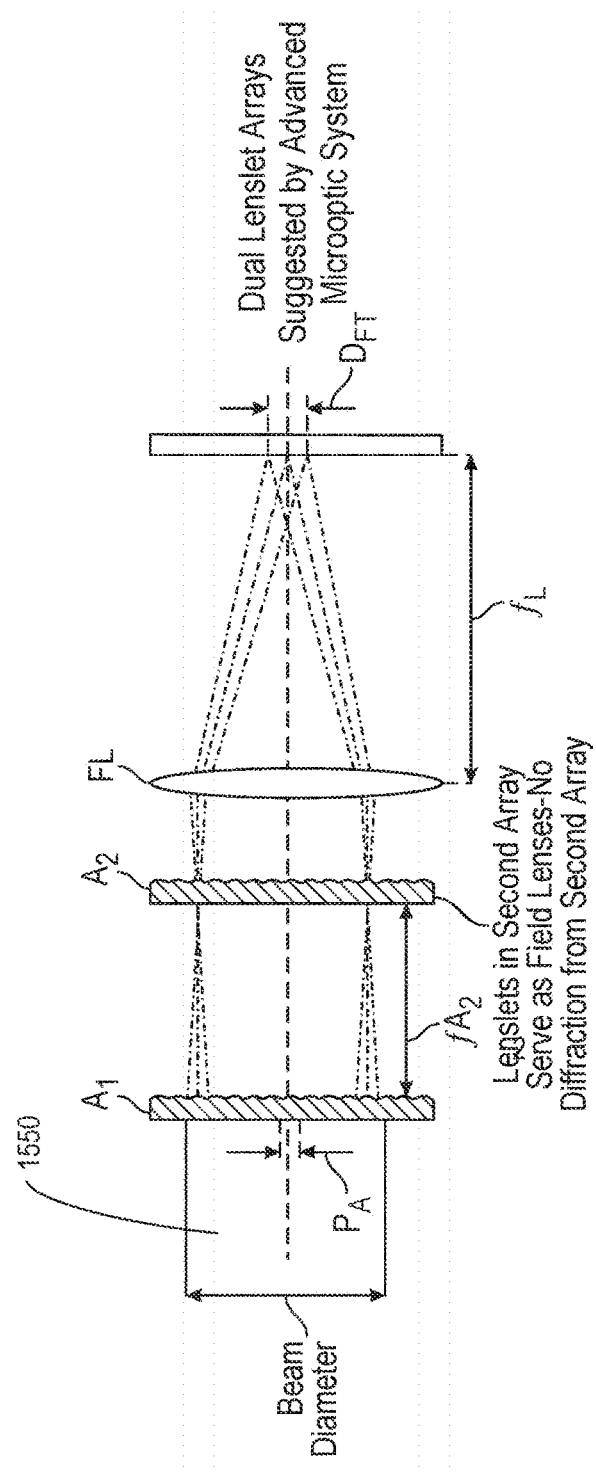
FIG. 15 is a schematic of an exemplary dual lenslet array for mitigation of diffraction pattern at the objective lens focal plane.

FIG. 15 is a schematic of an exemplary dual lenslet array A1, A2 for mitigation of diffraction pattern at the objective lens FL focal plane. An example is investigated for mitigation of the diffraction peaks in the irradiance pattern at the focal plane of the objective lens FL in the lenslet array beam launch approach. Here, a second lenslet array A2 having the same design as the first lenslet array A1 is placed in front of the lenslet array near the objective lens FL. In FIG. 15, the spacing $fA_2$ is set equal to the focal length of the lenslets in the array. This spacing may work for low power beams, but is likely to damage the lenslet near the objective lens for high power beams. A simple spreadsheet model was developed that predicts the size of the spots $D_{FT}$ at the objective focal plane and at the second lenslet array A2 as a function of the lenslet array spacing $fA_2$. This spreadsheet uses the paraxial ray trace approximation based on thin lenses and small ray angles.

Figure 16:
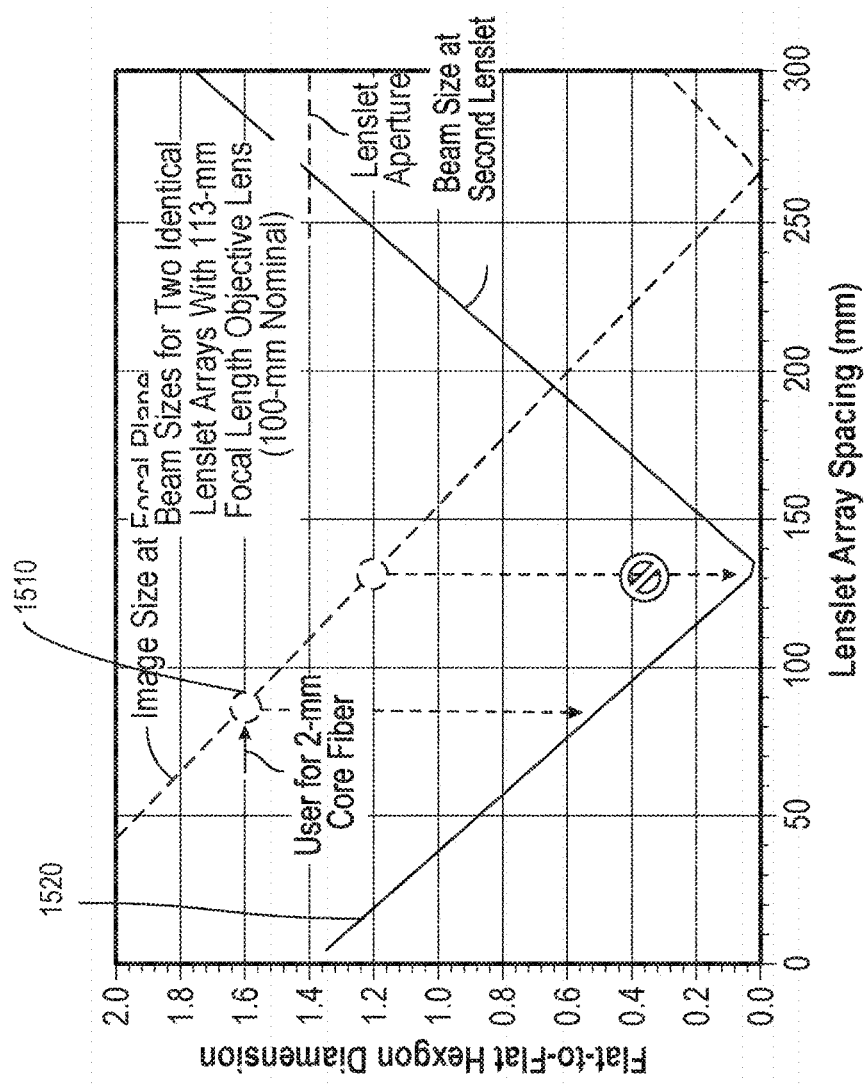
FIG. 16 is a graph of exemplary paraxial ray trace results for a dual lenslet using lenslet arrays and objective lens (100-mm nominal focal length).

FIG. 16 is a graph of exemplary paraxial ray trace results for a dual lenslet using lenslet arrays and objective lens (100-mm nominal focal length $f_L$). FIG. 16 illustrates the results of the spreadsheet calculation for the existing lenslet design and the existing 100-mm nominal focal length objective lens. The first curve 1510 presents the flat-to-flat dimension of the hexagonal spot at the focal plane of the objective lens FL as a function of the lenslet array spacing $fA_2$. The second curve 1520 presents the dimension of the spot $D_{FT}$ at the second lenslet array A2, although the shape tends to a circle near lenslet focus. For a 2.0-mm core diameter fiber, the hexagon flat-to-flat dimension is about 1.6 mm. The condition is indicated for an 85-mm lenslet array spacing $fA_2$ (dashed circle on the left). The second curve 1520 indicates that the spot size $D_{FT}$ on the lenses of the second lenslet array A2 is about 0.5 mm for this array spacing, which may be sufficiently large to avoid damage. It should be noted that the size of the hexagon at the objective lens focal plane may be adjusted over a small range by changing the array spacing $fA_2$. However, a spacing near the lenslet focal length $f_L$ (133 mm in this case) will likely damage the second lenslet array A2.

Figure 17:
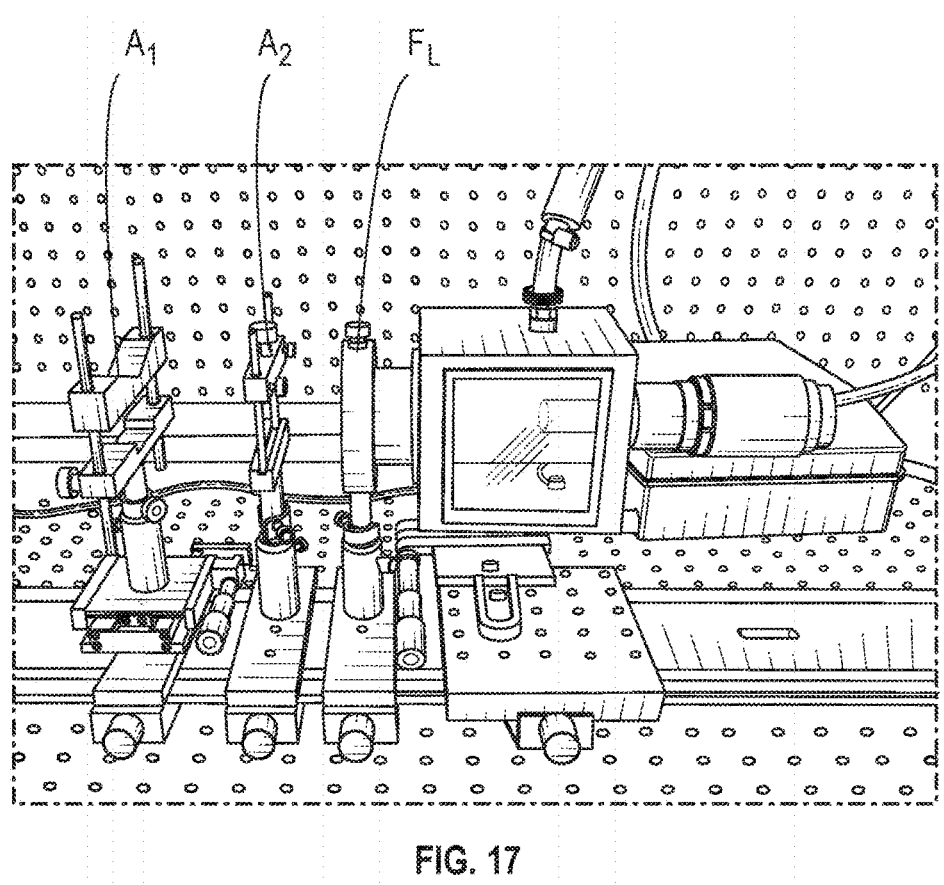
FIG. 17 illustrates an exemplary dual lenslet array beam conditioning setup as implemented on the test bed.
Figure 18:
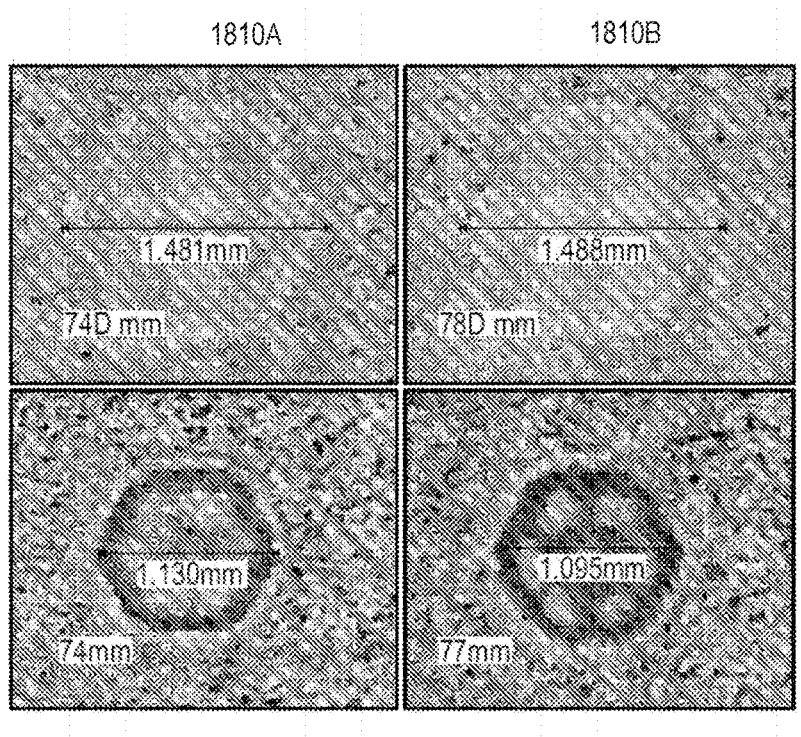
FIG. 18 illustrates exemplary burn impressions taken at the lens focal plane for the dual and single lenslet array setups.

FIG. 17 illustrates an exemplary physical dual lenslet array A1, A2 beam conditioning setup as implemented on the test bed. FIG. 18 illustrates exemplary burn impressions taken at the lens focal plane for the dual and single lenslet array setups. Testing of the Ceramoptec 2.0-mm core fibers continued after the test optical setup was modified to take advantage of the potentially smoother beam profile at the fiber face location offered by use of two lenslet arrays A1, A2. Burn impressions taken at the focal plane of the objective lens FL with this setup are shown in the upper two images 1810A, 1810B of FIG. 18. The lower two images 1819C, 1810D may be taken with the single lenslet array A1 setup which illustrate the higher irradiance peaks occurring with that setup.

Figure 19:
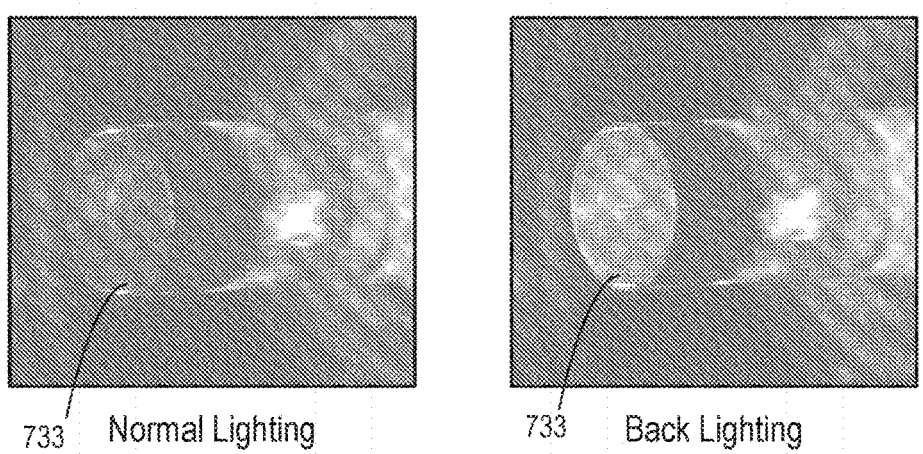
FIG. 19 illustrates exemplary images of the input fiber face after transmitting 1000 pulses at 4-J per pulse.

FIG. 19 illustrates exemplary images of the input fiber face 733 of Ceramoptec Fiber 10308-8 after transmitting 1000 pulses at 4-J per pulse. Table 4 presents the results of laser testing on the Ceramoptec 2-mm core fiber with the dual lenslet array A1, A2 beam launch test setup. After conditioning with pulses at low energy, three fibers may be tested at 3.7 J transmitted with 30, 200, and 1000 pulses at that level with no damage detected. Fiber 10308-8 is conditioned and then tested at 4 J with 1000 pulses with only slight input fiber face damage indicated in post-test photographs as shown in FIG. 19.

Figure 20:
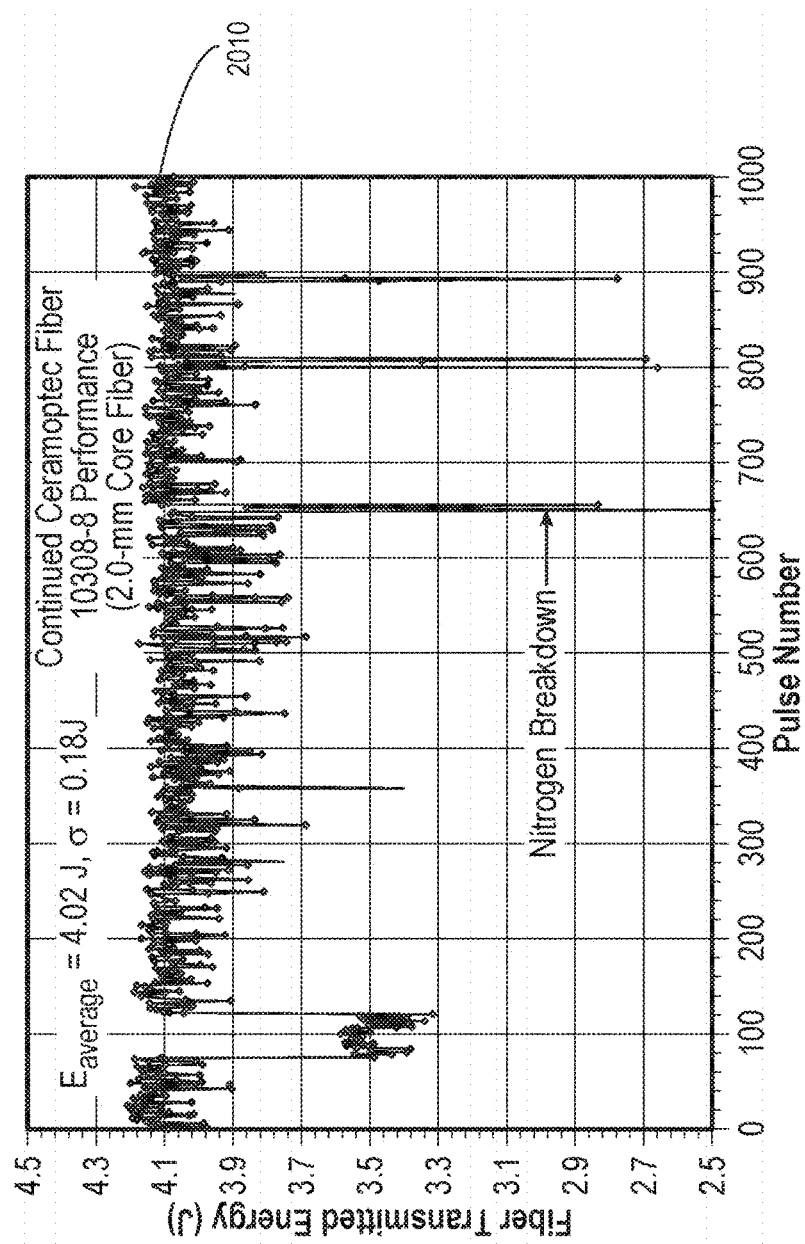
FIG. 20 is a graph of an exemplary transmitted pulse energy.

FIG. 20 is a graph of an exemplary transmitted pulse energy for Ceramoptec Fiber 10308-8. The history of pulse energy 2010 transmitted for the 1000 pulses on Ceramoptec Fiber 10308-8 is illustrated in FIG. 20. The initial drop in energy for Pulses 76-122 may be due to inadvertent use of the wrong attenuator in the beam. The temporary drop in energy for Pulses 651, 656, 801, 809, and 894 may be a result of nitrogen breakdown initiated near the input face of the fiber. These pulses may be correlated with a loud snapping sound heard emanating from the launch box. The electric fields near the surface are enhanced by constructive interference between the input laser beam and the 3.5 percent reflection from the uncoated silica. If there are any dust particles in the vicinity, they may be vaporized and initiate a plasma which partially absorbs the incident laser beam. These events may lead to the slight damage observed in the post-test images of FIG. 19.

TABLE 4

Test results for launching dual lenslet array
conditioned beams into 2.0-mm core fiber optics

| Fiber No. | Supplier | No. of Conditioning Pulses and Energy (J) | Highest Transmitted Avg. Energy (J) | No. Pulses at Highest Transmitted Avg. Energy | Failure Mode |
|---|---|---|---|---|---|
| 10308-4 | Ceramoptec | 550(Low) +200(2.75) | 3.75 | 30 + 4 shots at 4.2 J | No damage |
| 110230-5 | Ceramoptec | 350(Low) +200(2.65) | 3.70 | 200 | No damage |
| 10308-7 | Ceramoptec | 350(Low) +200(2.43) +200(2.97) | 3.74 | 1000 | No damage |
| 10308-8 | Ceramoptec | 60(Low) +200(1.93) +200(2.81) +200(4.06) | 4.02 | 1000 | Slight damage |
| 10308-9 | Ceramoptec | 120(Low) +200(2.0) +200(2.79) | ≈3.7 | 25 | Damaged on last 5 shots (misaligned?) |
| 10308-10 | Ceramoptec | 120(Low) +200(1.94) +200(2.86) | 3.41 | 1000 | No damage until last pulse (very slight damage) |

A problem can arise in remote application of high-peak-power laser pulses delivered by fiber optics. Each fiber has a damage threshold which limits the pulse energy that may be transmitted reliably. For applications requiring more energy per pulse, multiple fibers are employed. Splitting a single input laser beam into a multiplicity of smaller lower energy beams and launching the smaller beams into a matching number of optical fibers (see FIGS. 23, 31) in an assembly to be used in an industrial environment is complex. The assembly may be self-contained and maintain optical alignment of the optical train over long periods of time in the presence of thermal cycles and input laser-beam-axis wander. Conventionally, beams are split with beam splitting optical plates or prisms. For example, to produce six or eight reduced energy beams, the input beam could be split into two beams, each beam then split in two again to get four beams, and then each beam split again to get a total of eight beams. This would require seven 50-50 optical beam splitters and optical mounts. While this could be implemented, the maintenance of alignment of the beams on the fibers may be challenging.

Figure 21:
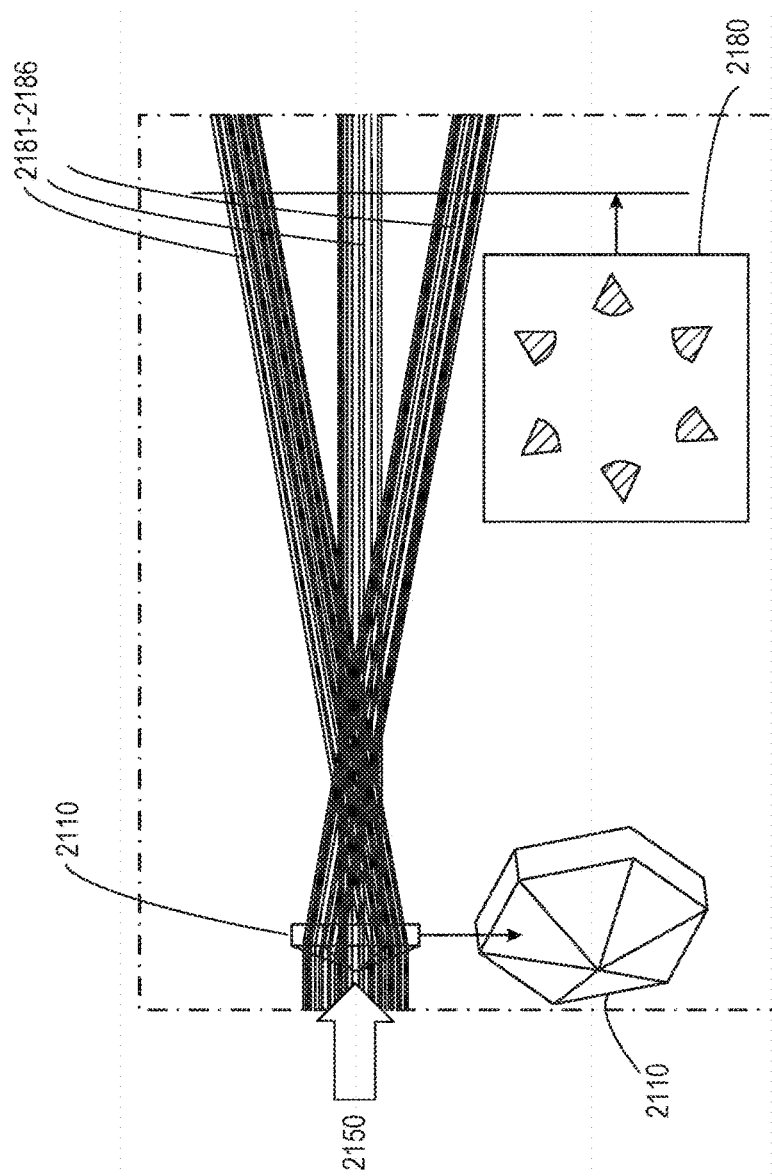
FIG. 21 is a schematic of an exemplary pyramidal prism beam splitting.

FIG. 21 is a schematic of an exemplary pyramidal prism beam splitting, e.g., employing a single pyramidal prism optic 2110. In FIG. 21, the splitting of a collimated circular input beam 2150 into six beamlets 2181-2186. In principle, the concept works for any number of splits, but in practice for many beamlets it may be necessary to split the input beam into two or more input beams for an equal number of prisms.

Figure 22:
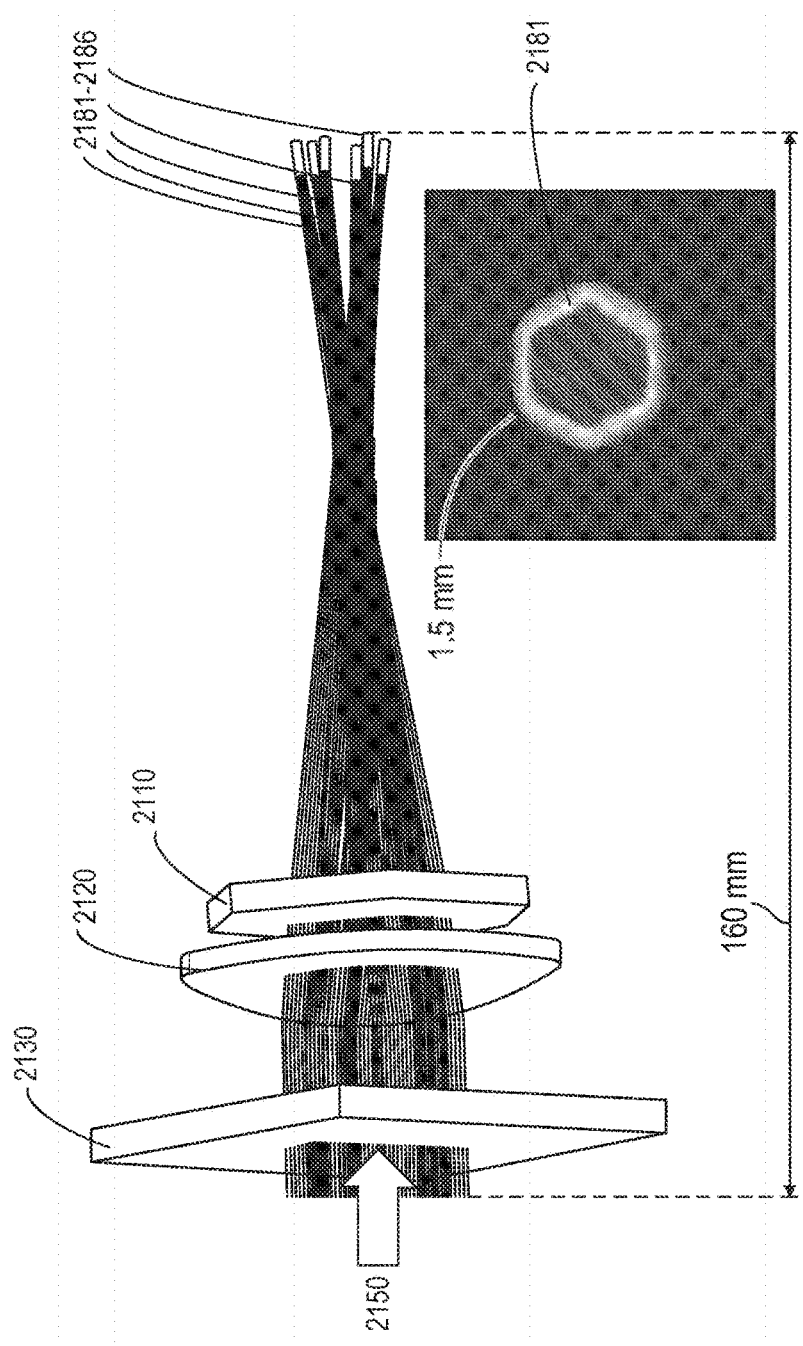
FIG. 22 is a schematic of an exemplary ray trace of pyramidal prism beam splitting used in combination with lenslet array beam conditioning for beam launch into 1.5-mm core fiber.

FIG. 22 is a schematic of an exemplary ray trace 2150 of pyramidal prism beam splitting 2110 used in combination with lenslet array 2130 and objective lens 2120 beam conditioning for beam launch into 1.5-mm core fiber. Lenslet array 2130 beam conditioning may be combined with the pyramidal beam splitting 2110 to launch homogenized beamlets into multiple fibers. FIG. 22 illustrates six beamlets 2181-2186. Other amounts of beamlets may be used. Mechanics may be included for holding the fiber terminations and balancing the energy among fiber beamlets.

Figure 23:
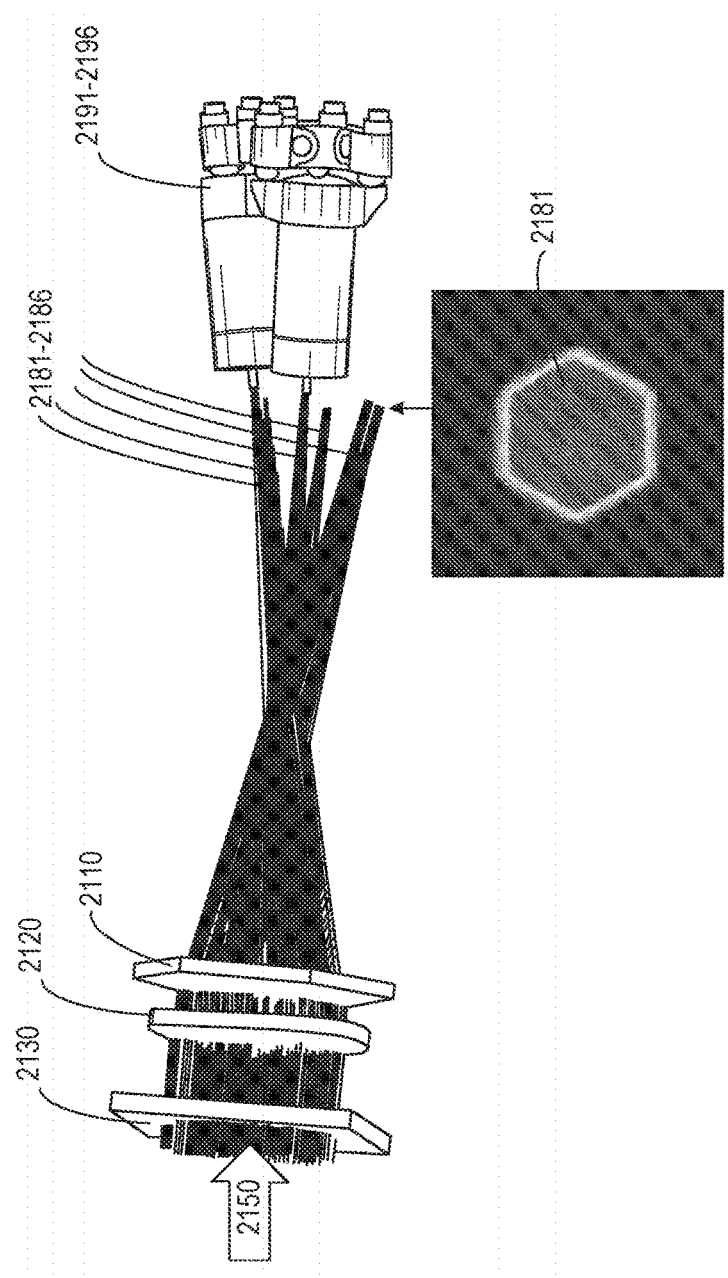
FIG. 23 is a schematic of an exemplary ray trace of pyramidal prism beam splitting used in combination with lenslet array beam conditioning for beam launch into 2.0-mm core fiber.

FIG. 23 is a schematic of an exemplary ray trace of pyramidal prism beam splitting 2110 used in combination with lenslet array 2130 and objective lens 2120 beam conditioning for beam launch into 2.0-mm core fiber. In order to have more space for fiber termination holders, an alternative design is described as illustrated in FIG. 23. For ease of analysis, the same lenslet array 2130 was employed in the ray trace, but a 2.0 mm core fiber was assumed so that the focal length of the objective lens 2120 could be increased. The prism pyramid angle may be increased to spread the beamlets further apart.

Figure 24:
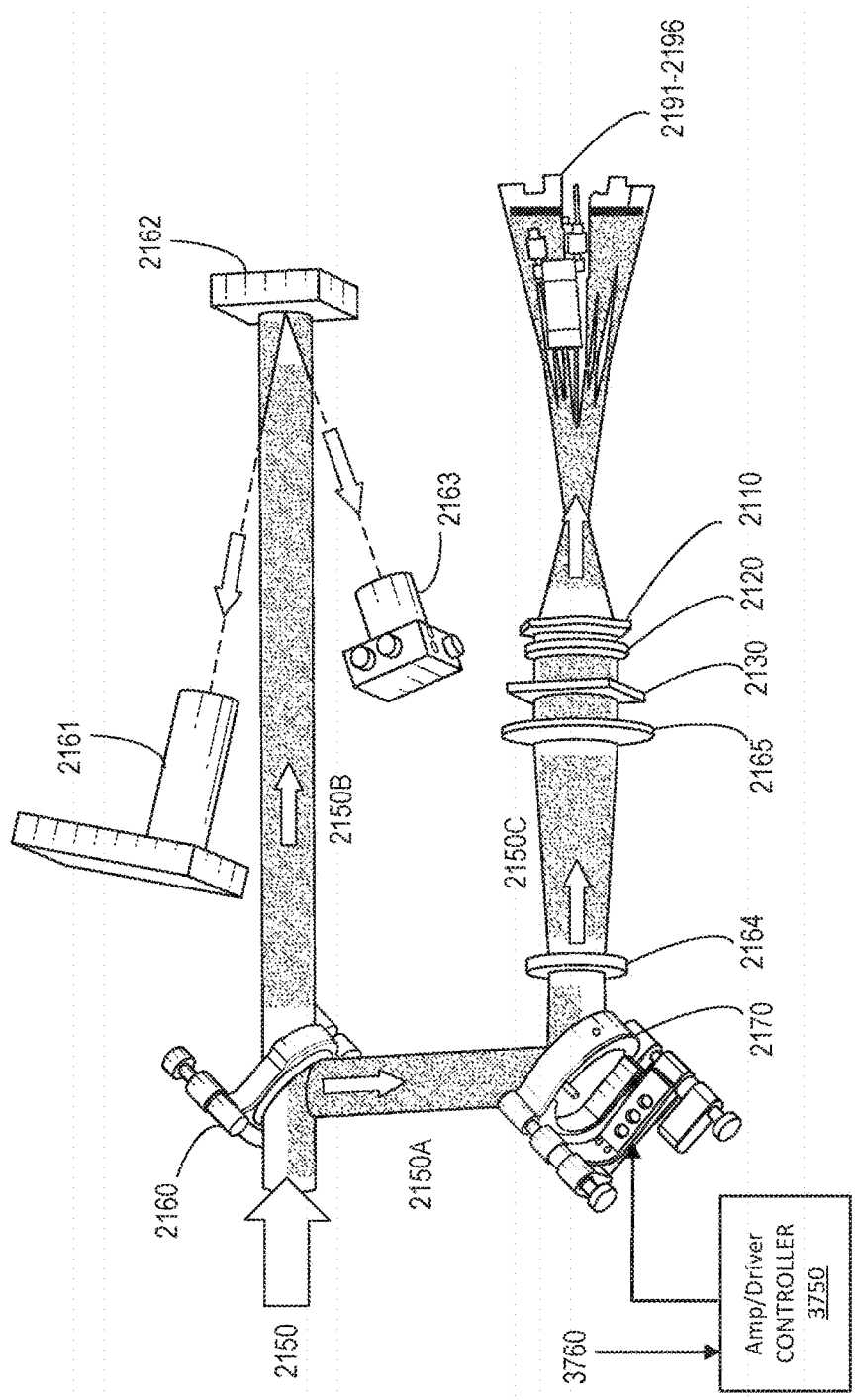
FIG. 24 is a schematic of an exemplary beam launch configuration with active steering mirror and input beam diagnostics.

FIG. 24 is a schematic of an exemplary beam 2150 launch configuration with active steering mirror 2170 and input beam diagnostics. FIG. 24 illustrates an exemplary layout of the complete beam launch system for six optical fibers 2191-2196 including beam diagnostics.

One of the mechanical issues that can arise in the practical application of any beam launching approach in a service environment is the slight wander of the input laser beam 2150 due to environmental thermal cycles. In some examples, shift of the beamlets 2191-2196 at the fiber face are kept below about 30 μm. Automatic beam alignment maintenance may mitigate the laser beam wander problem. In some examples, a small flat on the peak of the pyramidal prism 2110 transmits a small beamlet 2197 to a position sensitive detector (PSD) located near the fibers that may be used to feedback alignment error signals to a beam steering correction system. Also shown in FIG. 24 is an amplifier/driver controller electronics box 3750 which receives the PSD signals 3760 (see FIG. 39) and closes the loop by powering the mirror mount adjusters 2170.

For the remote delivery of laser pulses for LBI, a large number of fibers may be needed to meet a goal of delivering 40 or more joules to an inspection head. The described beam launch approach can avoid the mechanical and electronic complexity of maintaining beam alignment with as many as 19 single fibers. FIGS. 6A, B is a schematic of an example ray trace for direct launch of beamlets into a matched array of fibers. In this approach, the beam from the laser passes through a lenslet array 2130 which generates beamlets that are launched directly into aligned fibers. The raw collimated (or homogenized) beam from the laser passes through the lenslet array 2130 and forms a beamlet for every lenslet. These beamlets 2191-2196 converge to a waist at a location determined by the lenslet focal length. After passing though the waist, the beamlet expands to partially fill the input face of the adjacent fiber. A benefit of this approach is the simplicity of the mechanics relative to launching split beams into a collection of individual fibers. Potential issues can include avoiding gas breakdown at the first focus and avoiding damage in the fiber due to cylindrical focusing.

The input laser beam from the LBI laser may not have a uniform spatial fluence profile. This can result in different amounts of energy arriving at different fiber optics, which can change with time. The effect may be mitigated to some extent by keeping the fluence on each fiber well below the damage fluence, which may require many more fibers to share the beam energy than might otherwise be the case with a uniform input laser beam. Additionally or alternatively, the input laser beam may be homogenized.

Figure 25:
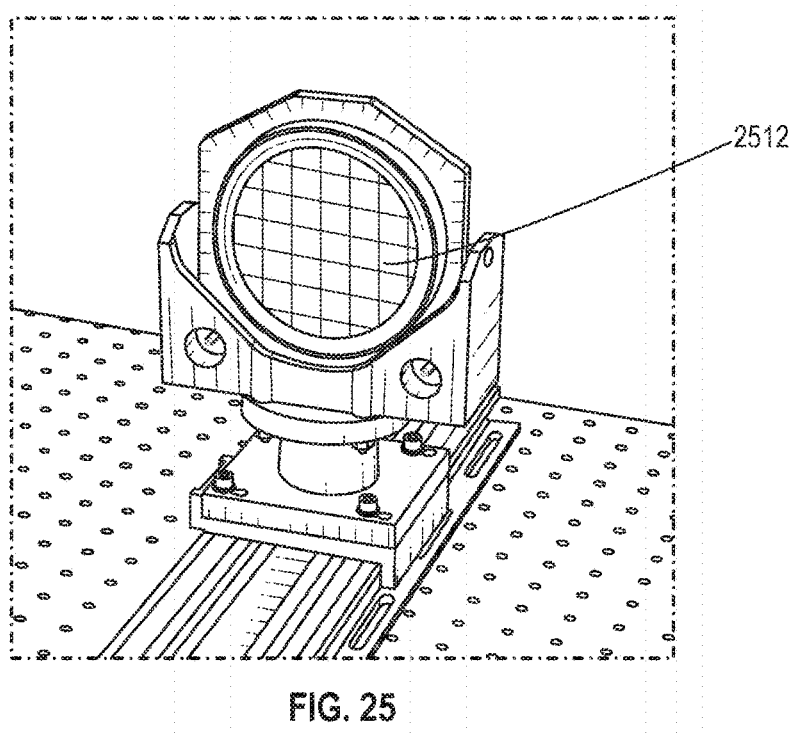
FIG. 25 illustrates an exemplary of a faceted mirror beam integrator fabricated by diamond turning.

FIG. 25 illustrates an exemplary of a faceted mirror beam integrator fabricated by diamond turning. Two approaches may be used to homogenize the input laser beam; a prism light guide and a faceted mirror beam integrator. An alternative beam homogenization technique includes employing a faceted reflective concave mirror. The beam homogenizer also known as a beam integrator 2512, may be used in high-power laser research. One such beam integrator 2512 is shown in the photograph of FIG. 25. The integrator 2512 was fabricated by II-VI, Inc. using diamond turning of copper followed by application of a special gold-based high reflectance coating. The integrator 2512 in the FIG. 25 has square facets, but hexagonal facets may also be diamond machined which are more appropriate for the hexagonal array of lenslets.

Figure 26:
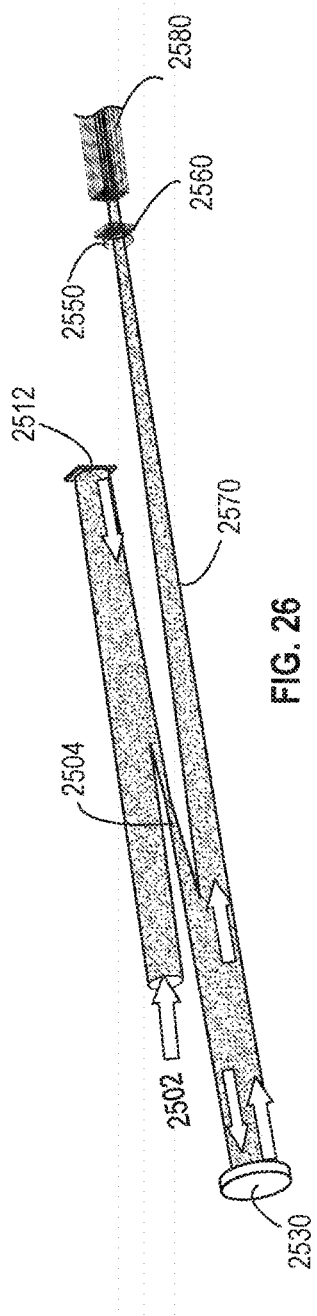
FIG. 26 is a schematic of an exemplary faceted mirror beam integrator layout for lenslet array-to-fiber array beam launch.

FIG. 26 is a schematic of an exemplary faceted mirror beam integrator 2510 layout for lenslet array 2560-to-fiber array 2580 beam launch. A collimated input beam 2502 from the laser is incident on the concave faceted mirror of the integrator 2510 which reflects portions of the beam from each facet to a common location determined by the average curvature of the concave surface. At this location, all of the beams from each facet overlap to form a uniform intermediate image 2504 having the shape and size of the facets. The intermediate image 2504 is reimaged by a reimage mirror 2530 to the location of the lenslet array 2560 as shown in FIG. 26. The magnification provided by the reimage mirror 2530 may be selected to provide an appropriately sized hexagonal shaped beam at the entrance to the lenslet array 2560. The beam at the lenslet array 2560 is uniform, regardless of spatial variations in irradiance in the beam 2502 from the laser.

Figure 27:
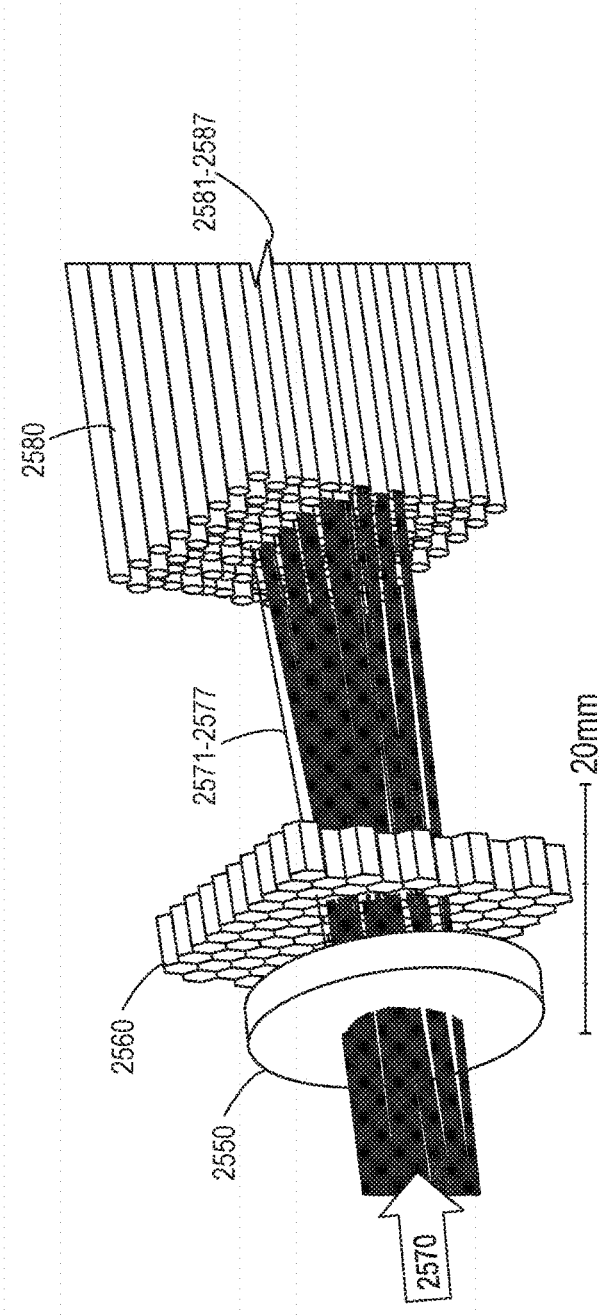
FIG. 27 illustrates an exemplary close-up view of lenslet array-to-fiber array beam launch.

FIG. 27 illustrates an exemplary close-up view of lenslet array 2560-to-fiber array 2580 beam launch. Ray trace results are illustrated for a uniform hexagonal beam passing through a lenslet array 2560 matched to a fiber array 2580 with the same spacing. The focal length of the individual lenslets may be selected to maximize irradiance uniformity on the fiber face and minimize cylindrical focusing in the fiber. The converging beam 2570 from the reimage mirror 2530 leads to radial spreading of the beamlets from lenslets that are not on axis. This spreading may be compensated by inserting a lens 2550 before the lenslet array 2560 to correct for this effect.

Figure 28:
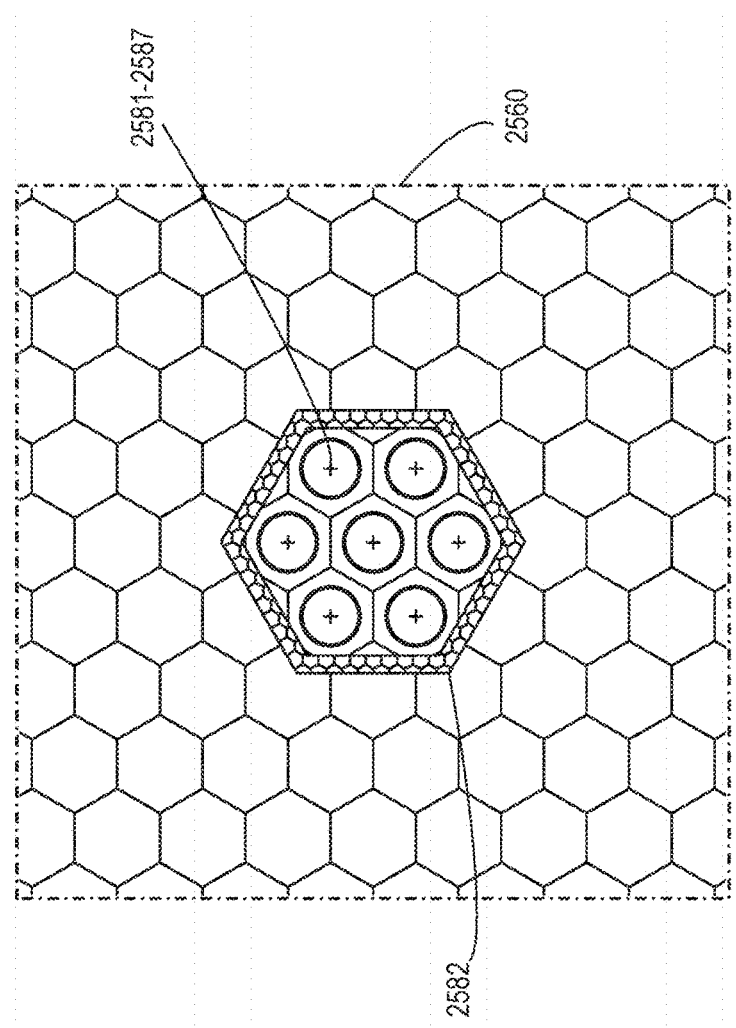
FIG. 28 is a schematic of an exemplary geometry of lenslet array (hexagons) and aligned 7-fiber array (circles).

FIG. 28 is a schematic of an exemplary geometry of lenslet array (hexagons) 2560 and aligned 7-fiber array 2581-2587 (circles). In FIG. 28, there are "overflow" rays that do not reach the central 7 fibers 2581-2587. This may be understood by considering the lenslet array 2560 and beam geometry as illustrated in FIG. 27. The hexagons are the outlines of the lenslets in the array 2560 and the circles are the aligned fibers. The large hexagon outline is the boundary 2582 of the integrated beam at the lenslet array 2560. Some of the beam falls on lenslets that have no corresponding fiber. These rays are referred to as overflow rays and are prevented from hitting the connector holding the fibers, probably by using a "scraper" to absorb or reflect the energy.

Figure 29:
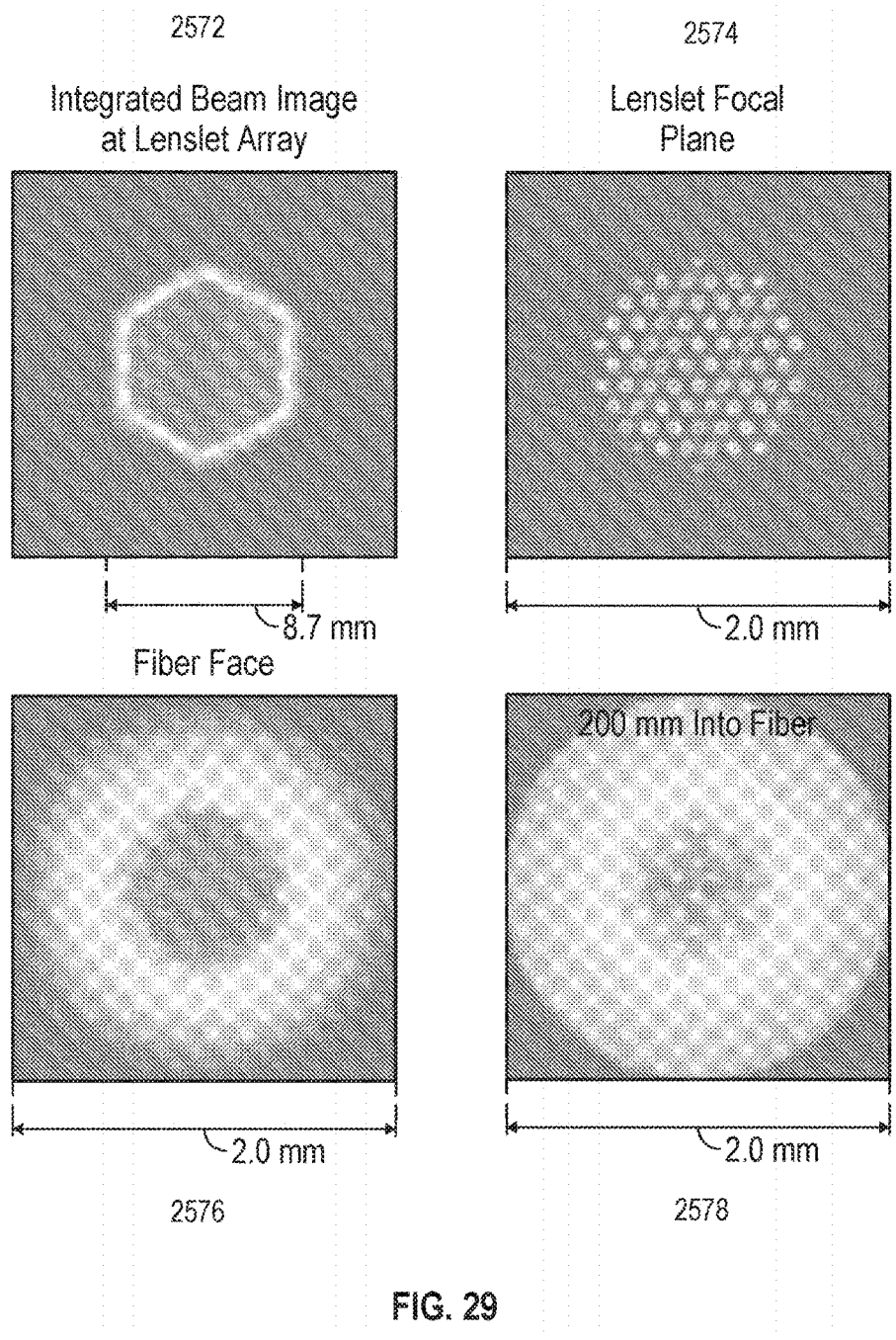
FIG. 29 is a schematic of exemplary irradiance patterns in lenslet array-to-fiber array launch concept from geometric ray trace analysis.

FIG. 29 is a schematic of exemplary irradiance patterns 2572, 2574, 2576, 2578 in lenslet array-to-fiber array launch concept from geometric ray trace analysis. In FIG. 29, irradiance images 2572, 2574, 2576, 2578 are illustrated at various locations near the lenslet array taken for a geometric ray trace analysis. The left image 2572 shows the input beam hexagonal shape provided by the beam integrator 2510. The next image 2574 to the right shows the pattern at the focal plane of a single lenslet. Instead of a single focal spot as is the case for a raw collimated beam, there is a focal spot for each beam integrator 2510 facet exposed to the beam from the laser. This distribution can minimize the chances for nitrogen breakdown and plasma formation. The next image 2576 shows the irradiance pattern at the fiber face which is identical for each of the 7 fibers 2581-2587. The last image 2578 on the right is typical of irradiance patterns in the fiber and no significant focusing is noted.

Figure 30:
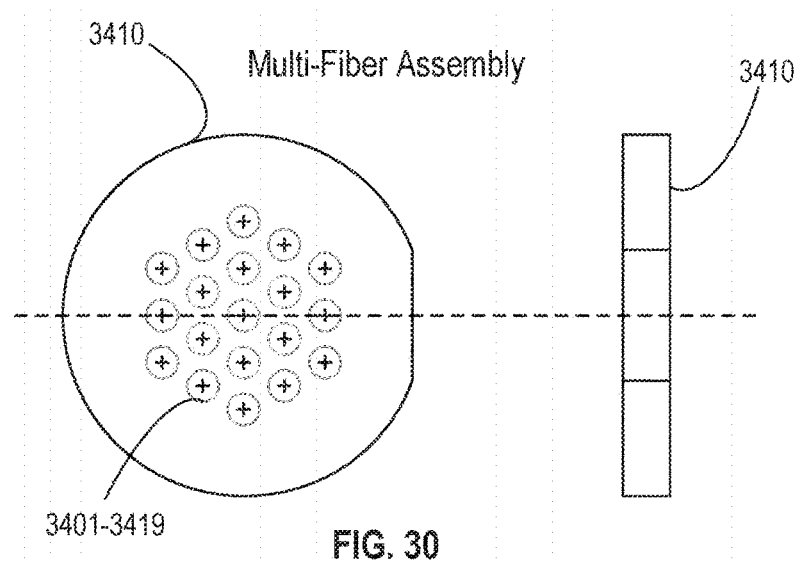
FIG. 30 is a schematic of an exemplary fused silica plate holder for 2-mm core fibers in input umbilical connector.

FIG. 30 is a schematic of an exemplary fused silica plate holder 3410 for 2-mm core fibers in the input umbilical connector. A feature of the lenslet array-to-fiber array beam launch concept is the simplification of keeping individual fibers aligned to the launched beam. This may be accomplished with a precision drilled fused silica plate 3410 in the fiber connector 3400 (see FIG. 31) that holds the fibers in a hexagonal array with spacing dimensions matched to the lenslet array spacings. In some examples, there are 7 fibers 3301-3307 (see FIG. 32), but other amounts of fibers may be used, e.g., 19 fibers (see FIG. 36). The 7-fiber assembly 3100 would be appropriate for demonstrations at the 15-20 J level and the 19-fiber assembly 3100D may be suitable for demonstrations of a system capable of delivering 40-45 J.

Figure 31:
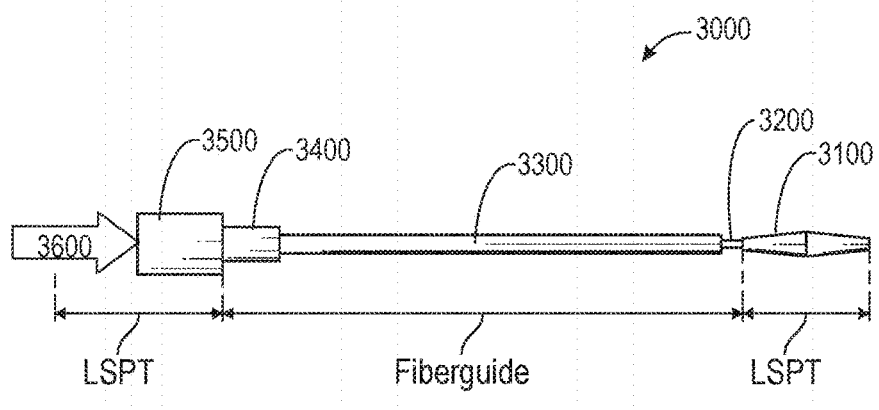
FIG. 31 is a schematic of the flexible beam delivery exemplary for remote LBI applications.

FIG. 31 is a schematic of the flexible beam delivery example for remote LBI applications. The rectangles in the center represent the complete fiber assembly 3000. It includes an input connector 3400 ready to insert into a fabricated socket assembly mounted on an optical breadboard for testing. The breadboard includes all of the optics installed to transfer the raw beam from the LBI laser to the input connector 3400 of the fiber assembly. The breadboard can include a light-tight cover and may be mounted on the LBI laser cart or separate cart. The fiber assembly 3000 includes flexible conduit 3300 to carry the fibers to the inspection head 3100. There may be a termination output connector 3200 that will provide a close packed array of fibers at its exit. A socket can accept the terminating connector in the inspection head.

Figure 32:
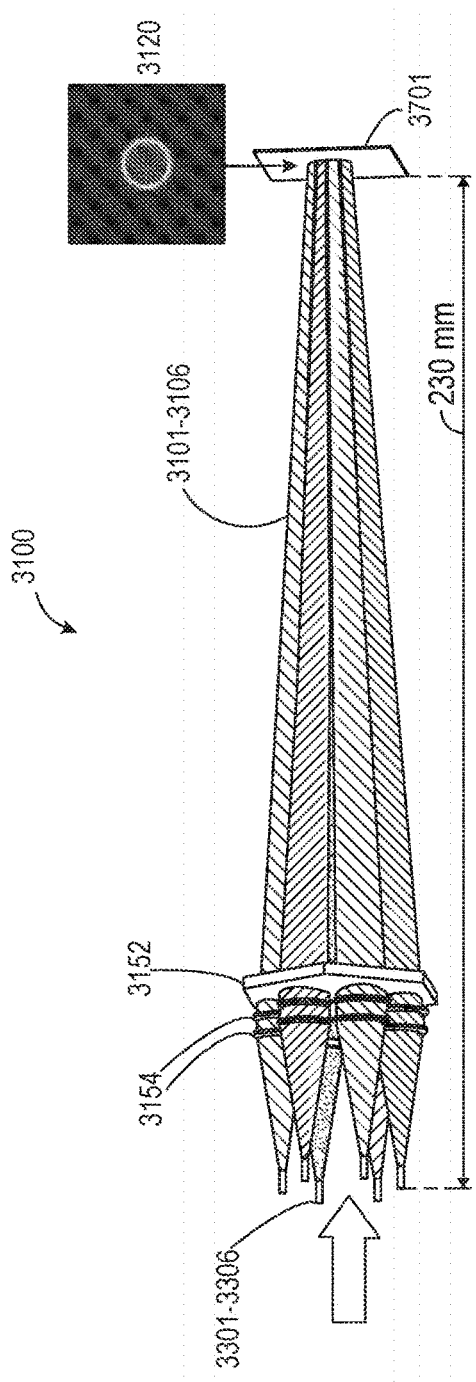
FIG. 32 is a schematic of an exemplary initial beam combining concept for the output of six fibers terminated at the LBI process head.

FIG. 32 is a schematic of an exemplary initial beam combining device 3152 for the output of multiple beamlets 3101-3106 terminated at the LBI inspection head 3100. The beamlets 3101-3106 may be combined from a multiplicity of fibers terminated in an LBI inspection head 3100 to produce a single circular laser spot 3120 at the work surface 3701 suitable for LBI. The initial approach is illustrated in the ray trace of FIG. 32 for the case of six fibers 3301-3106 delivering beamlets 3101-3106 terminated in the LBI inspection head 3100. The inspection head device 3100 includes image relay lenses 3154 for each fiber to reimage the output of the individual fibers 3301-3106 at a fixed distance to the work surface 3701. In some examples, the device includes two image relay lenses 3154 per fiber. The distance may be determined to be similar to the distance in the current LBI inspection head 3100 from the wet window to the work surface 3701. A prism beam combiner 3152, e.g., pyramidal prism, serves to overlap the individual beams 3101-3106 at the work surface 3701.

Figure 33:
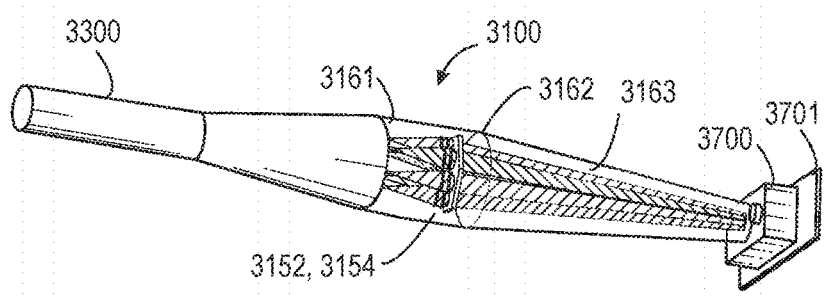
FIG. 33 is a schematic of an exemplary mechanical envelope of an LBI inspection head for confined spaces with a straight attachment module.

FIG. 33 is a schematic of an exemplary mechanical envelope of an LBI inspection head 3100 for confined spaces with a straight attachment module. An inspection head mechanical envelope may be suitable for confined spaces. The portion to the right of the disconnection plane includes one of a set of attachment modules for different inspection requirements. Features at the disconnection plane may include a free rotation joint 3162 with detents or locking mechanism to allow the operator to orient the end block to match the joint composite structure 101 being inspected. The rotation joint 3162 can also include a quick-disconnect feature for rapid reconfiguration of the head. The output surface of the prism can serve as the wet window or a separate window may be placed after it. For the type of head shown, wires for the EMAT and contact sensors 3700 and tubes for water flow would be outside the envelope and include quick disconnect hardware. Use of surface contact sensors can maintain Class 1 Laser operations.

Figure 34:
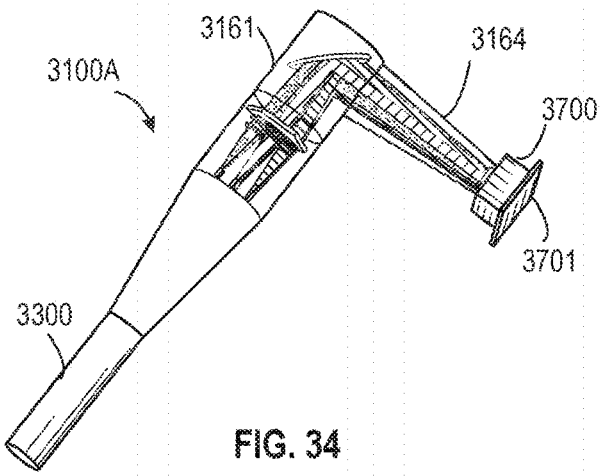
FIG. 34 is a schematic of an exemplary mechanical envelope of LBI inspection head for confined spaces with 90-degree turn angle attachment module.

FIG. 34 is a schematic of an exemplary mechanical envelope of LBI inspection head 3100A for confined spaces with 90-degree turn angle attachment module 3164. Attachment module of other angles (e.g., 30-degree, 45-degree) may also be changed to meet the needs. An alternative disconnecting beam delivery attachment module is illustrated in FIG. 34. With this module, the beams can make a sharp turn before converging to the single spot on the work surface. The module may be used to get into some confined spaces. Other turn angles may be achieved by different tilt angles of the mirror or (for shallow angles) wedging the output surface of the prism 3154.

Figure 35:
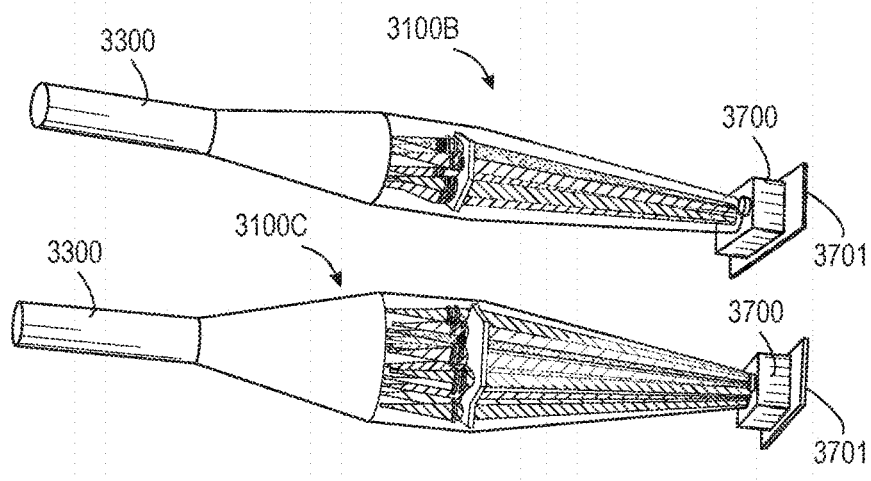
FIG. 35 is a schematic of an exemplary mechanical envelope of LBI inspection head for confined spaces with 6 fibers and 12 fibers
Figure 36:
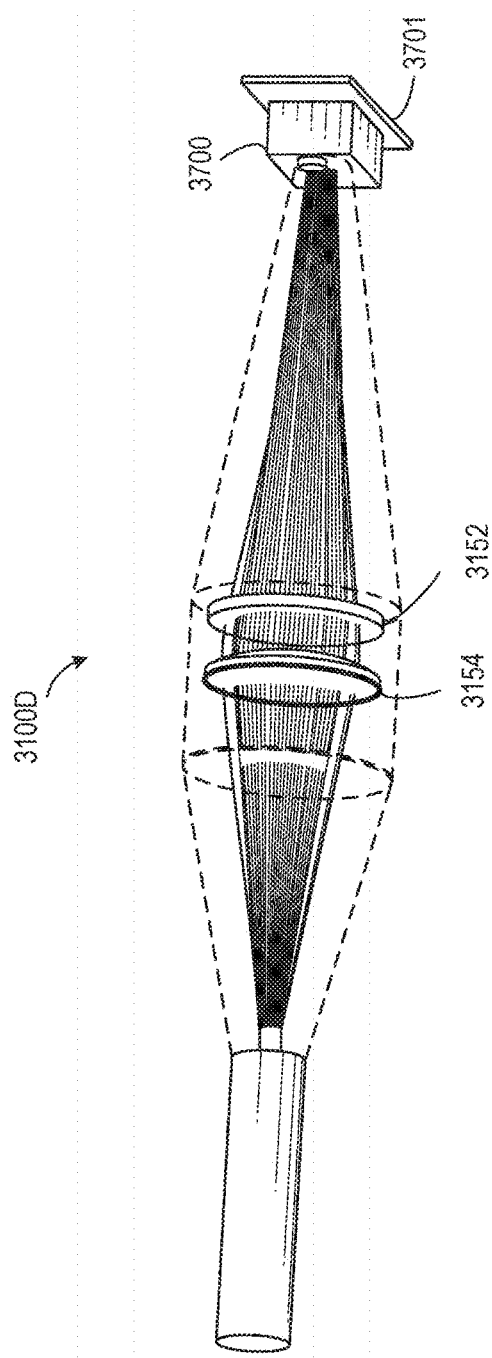
FIG. 36 is a schematic of an exemplary inspection head for a large number of fibers.

FIG. 35 is a schematic of an exemplary mechanical envelope of an LBI inspection head 3100B, 3100C for confined spaces with example 6 fibers and 12 fibers. Other numbers of fibers may be used. FIG. 36 is a schematic of an example inspection head for a large number of fibers. For larger numbers of fibers, individual lenses and a beam combining prism 3154 may not be needed, as illustrated in FIG. 36. The lens location may be adjusted so that the fiber face images may be slightly out of focus to smear out the edges of the fiber images.

FIG. 37 is a schematic of an exemplary irradiance patterns 3120, 3122, 3124 at the work surface 101 for various fiber counts. In some examples, the 7- and 19-fiber patterns 3120, 3124 are suitable for LBI. The 13-fiber pattern 3122 may not add much value over the 7-fiber pattern 3120.

Figure 38:
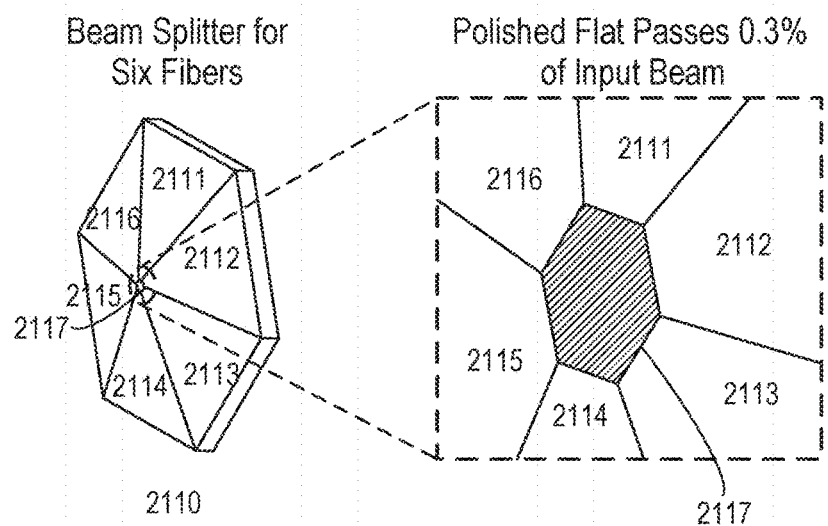
FIG. 38 is a diagram of an exemplary modification to the pyramidal prism to produce a small diagnostic beam for beam wander tracking.

FIG. 38 is a diagram of an exemplary modification to the pyramidal beam splitting prism 2110 (as shown in FIG. 21) to produce a small diagnostic beam 2187 (see FIG. 39) for beam wander tracking. Changes in the lenslet array 2130, objective lens 2120, and pyramidal prism 2110 parameters may be made to meet the mechanical requirements of the compact fiber mounts of FIG. 22. In a service environment (see FIG. 24), a slight wander of the input laser beam 2150 may occur, e.g., due to environmental thermal cycles. In some examples, shift of the beamlets 2181-2186 at the fiber may be kept below about 30 μm with beam tracking using a modification to the prism 2110. For example, in FIG. 38 the pyramidal beam splitting prism 2110 may have a triangular surfaces 2111-2116, and the prism 2110 may be modified with a small flat ground and polished tip 2117 at an apex of the prism 2110. In an example, the flat portion of the tip 2117 may be centrally located in the prism 2110. In other examples, the flat portion or polished tip 2117 or apex may not necessarily be located at the center of the prism 2110. The flat portion or polished tip may transmit a small portion of the input 2150 beam to a position sensitive detector (PSD) 3710 or camera to allow tracking of the beam axis motion.

Figure 39:
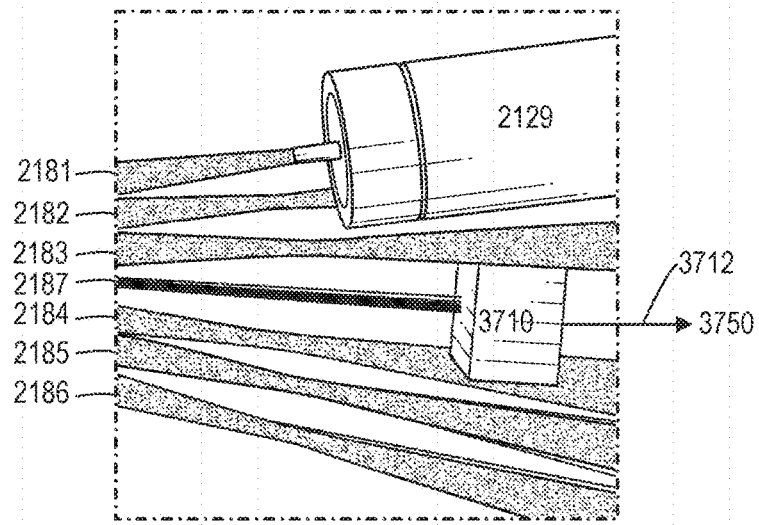
FIG. 39 is a schematic of an exemplary location of a position sensitive detector (PSD) for a beam alignment maintenance system.

FIG. 39 is a schematic of an exemplary location of the position sensitive detector (PSD) 3710 or camera for a beam alignment maintenance system to provide feedback alignment error signals 3712 to the amplifier/driver controller 3750 (see FIG. 24) in a beam steering correction system. FIG. 24 is a schematic of an exemplary beam launch configuration with active steering mirror 2170 and input beam diagnostics. Other configurations are possible. The error signals 3712 from the PSD 3710 may be fed to the amplifier/driver controller to control a motor or piezo actuated beam steering mirror 2170. An amplifier/driver electronics box 3750 may receive the PSD error signals 3712 and close the loop by powering the mirror 2170 through mount adjusters.

While the particular examples above have been illustrated and described herein, it should be understood that various other changes and modifications may be made without departing from the spirit and scope of the claimed subject matter. For example, the splitter/combiner prism in FIGS. 21 and 24 may be used in the inspection heads as shown in FIGS. 32-36.

A method of laser bond inspection is disclosed. The method includes the operations of: directing a plurality of laser beams 3101-3106 propagated through a bundle of optical fibers 3301-3306 onto a surface 101 of a composite structure 100 to interrogate an integrity of at least one bonding interface 106A of the defined surface area within the composite structure; wherein: the composite structure 100 is formed by bonding at least two different layers 102, 104 of materials having the at least one bonding interface 106 formed therebetween. The plurality of laser beams 3101-3106 delivering a predefined total energy, the laser beams 3101-3106 in each of the optical fibers 3301-3306 may deliver a substantially equal portion (i.e., homogenized beams) of the predefined total energy that exerts compressive stress waves 117 upon impacting over a defined area size 120 on the surface 101 of the composite structure 100. A response of reflected stress waves signature 118 may be measured over the defined area size 120 of the surface of the composite structure 100; and determining, according to the response of reflected stress waves signature 118, whether a bonding defect occurs over the defined area size 106A within the at least one bonding interface 106 formed therebetween the at least two different layers of materials 102, 104.

Although various aspects of the claimed subject matter have been described herein, such aspects need not be utilized in combination. It is therefore intended that the appended claims cover all such changes and modifications that are within the scope of the claimed subject matter.

What is claimed is:
1. A method of laser bond inspection, comprising:
directing a plurality of laser beams propagated through a bundle of optical fibers onto a surface of a composite structure to interrogate an integrity of at least one bonding interface of a surface area within the composite structure; wherein:
the composite structure is formed by bonding at least two different layers of materials having the at least one bonding interface formed therebetween,
the plurality of laser beams delivering a predefined total energy, the laser beams in each of the optical fibers deliver a substantially equal portion of the predefined total energy that exerts compressive stress waves upon impacting over a defined area size on the surface of the composite structure;

measuring a response of a reflected stress waves signature over the defined area size of the surface of the composite structure; and determining, according to the response of the reflected stress waves signature, whether a bonding defect occurs over the defined area size within the at least one bonding interface formed therebetween the at least two different layers of materials, wherein the plurality of laser beams propagated in the optical fibers bundle are generated through steps, comprising:

generating by a laser system, collimated laser beams;

converging, using at least a lenslet array, the collimated laser beams into a homogenized converged beam;

splitting, using a prism beam splitter, the homogenized converged beams into a plurality of beamlets; wherein each beamlet is directed to and propagated within a respective optical fiber in the plurality of optical fibers bundle;

using a position sensitive detector to monitor an alignment of the plurality of beamlets, such that a deviation of the plurality of beamlets exceeding a threshold value from a reference coordinate generates an error signal to be fed back to a controller to correct a beam angle of the collimated beams to offset the deviation; and sampling a beamlet through a flat area at a peak of the prism beam splitter for alignment monitoring, wherein the position sensitive detector is disposed at a center of an output side of the beam splitting prism to receive the transmitted portion of the input laser beam to track a beam axis motion and to provide feedback alignment error signals based on the beam axis motion, and a driver to receive the feedback alignment error signals and to drive a motor or piezo actuated beam steering mirror based on the feedback alignment error signals to correct any wandering of the input laser beam.

2. The method of claim 1, wherein the predefined total energy is set at no more than half of a destructive energy level of the at least one bonding interface.

3. The method of claim 2, wherein the determining of the bonding defects comprises comparing a baseline response to the measured response of reflected stress wave signature, wherein the baseline response is a previously determined value of the destructive energy level to destroy a bonding interface of a representative composite structure having one or more of: comparable layer thickness and comparable number of layers.

4. The method of claim 1, wherein the optical fibers bundle comprises any one of: 6, 7, 13 and 19 optical fibers.

5. The method of claim 4, wherein a diameter of each of the optical fibers in the bundle being any one of: 1.5 mm and 2.0 mm.

6. The method of claim 1, comprising masking the surface of the composite structure with an adhesive tape prior to the directing of the plurality of laser beams to the defined area size.

7. The method of claim 6, comprising injecting water over the masked surface of the defined area size prior to and during the directing of the plurality of laser beams over the defined area size.

8. The method of claim 7, wherein the compressive stress waves are generated when the plurality of laser beams are directed to the masked surface of the defined area size under a presence of the water, wherein the generated compressive stress waves travel beneath the surface of the composite structure to penetrate the defined area size of the at least one bonding interface.

9. The method of claim 8, wherein the compressive stress waves are reflected back at an opposite surface of the composite structure as the reflected response which penetrates the defined area size of the at least one bonding interface in a return path, such that the measured reflected response is indicative of the integrity of the at least one interface over the defined area size of the composite structure.

10. The method of claim 1, comprising outputting the plurality of laser beams through an inspection head and measuring the response of the reflected stress waves signature by an electromagnetic acoustic transducer (EMAT) sensor which is integrated into the inspection head.

11. The method of claim 10, wherein the inspection head is integrated with a water nozzle for injecting water over a masked surface of the defined area size prior to and during the interrogation of the integrity of the at least one bonding interface.

12. The method of claim 10, wherein the inspection head is configurable to direct the plurality of laser beams at different angles through an angle adapter.

13. The method of claim 1, comprising disposing an image relay lens for each of the plurality of optical fibers, and positioning a prism beam combiner after the image relay lenses for combining the plurality of laser beams.

14. The method of claim 1, comprising disposing a laser beam integrator opposite a reimage mirror to provide a uniform input laser beam at the lenslet array.

15. The method of claim 14, comprising disposing a compensating lens between the reimage mirror and the lenslet array to reduce radial spreading of the plurality of beamlets after the lenslet array-.

16. The method of claim 1, wherein the converging of the collimated laser beams comprises disposing an objective lens after the lenslet array, wherein the lenslet array used in combination with the objective lens reduces a likelihood of gas breakdown.

17. The method of claim 16, comprising disposing a second lenslet array between the lenslet array and the objective lens to mitigate diffraction peaks in an irradiance pattern at the objective lens.

* * * * *